United States Patent
Butler

(10) Patent No.: US 9,580,926 B1
(45) Date of Patent: Feb. 28, 2017

(54) UTILITY OR METER POLE TOP REINFORCEMENT METHOD AND APPARATUS

(71) Applicant: PLS Technologies, Inc., Palm Harbor, FL (US)

(72) Inventor: Robert P. Butler, Palm Harbor, FL (US)

(73) Assignee: PLS Technologies, Inc., Palm Harbor, FL (US)

( * ) Notice: Subject to any disclaimer, the term of this patent is extended or adjusted under 35 U.S.C. 154(b) by 0 days.

(21) Appl. No.: 15/352,176

(22) Filed: Nov. 15, 2016

Related U.S. Application Data

(60) Continuation-in-part of application No. 15/055,832, filed on Feb. 29, 2016, now Pat. No. 9,528,290, which is a continuation-in-part of application No. 14/624,845, filed on Feb. 18, 2015, now abandoned, which is a division of application No. 14/082,824, filed on Nov. 18, 2013, now Pat. No. 8,984,834.

(51) Int. Cl.
| | |
|---|---|
| *E04H 12/22* | (2006.01) |
| *E04C 3/02* | (2006.01) |
| *H02G 7/20* | (2006.01) |
| *E02D 5/22* | (2006.01) |
| *H02G 7/05* | (2006.01) |
| *E04H 12/24* | (2006.01) |
| *H02G 1/02* | (2006.01) |

(52) U.S. Cl.
CPC ......... *E04H 12/2292* (2013.01); *E02D 5/226* (2013.01); *E04C 3/02* (2013.01); *E04H 12/24* (2013.01); *H02G 7/05* (2013.01); *H02G 7/20* (2013.01); *E04C 2003/026* (2013.01); *H02G 1/02* (2013.01)

(58) Field of Classification Search
CPC ..... E04B 1/40; E04B 2001/405; E04H 12/24; E04H 12/04; E04H 12/2292; H01F 27/06; H01B 17/16; H01B 5/02; H02G 7/20
See application file for complete search history.

(56) References Cited

U.S. PATENT DOCUMENTS

| | | | | |
|---|---|---|---|---|
| 1,420,430 | A * | 6/1922 | Jaeckle | E04H 12/04 403/312 |
| 1,802,995 | A * | 4/1931 | Williams | E04H 12/24 248/219.3 |
| 2,392,222 | A * | 1/1946 | Brickman | E04H 12/2215 52/154 |
| D160,668 | S * | 10/1950 | Smith | D8/396 |

(Continued)

*Primary Examiner* — Joshua J Michener
*Assistant Examiner* — Matthew Gitlin
(74) *Attorney, Agent, or Firm* — Nicholas Pfeifer; Smith & Hopen, P.A.

(57) ABSTRACT

The present invention includes a prosthetic apparatus for reinforcing a top of a rotted/deteriorated upstanding pole. The prosthetic ensleeves or sandwiches the pole at its uppermost end to provide an elongate support on which insulators and other various equipment can be safely secured. The present invention may include diametrically opposed support stringers to increase support and rigidity. An embodiment may include pole access apertures, insulator cutouts, and bolt receiving channels. The present invention provides a simplistic and inexpensive fix to preexisting rotting utility poles while also enabling a safe and efficient installation.

12 Claims, 25 Drawing Sheets

(56) References Cited

U.S. PATENT DOCUMENTS

| | | | | |
|---|---|---|---|---|
| RE24,133 E | * | 3/1956 | Bloedow | E04B 1/40 403/403 |
| 2,884,670 A | * | 5/1959 | Garrison | E04B 1/2608 248/219.4 |
| 2,990,151 A | * | 6/1961 | Phillips | F16L 3/24 211/107 |
| 3,220,679 A | * | 11/1965 | Larson | H02G 7/205 174/136 |
| 3,625,463 A | * | 12/1971 | Scholz | H02G 7/20 174/158 R |
| 3,856,250 A | * | 12/1974 | Farmer | H01F 27/06 211/107 |
| 3,921,949 A | * | 11/1975 | Coon | H02G 7/20 174/163 R |
| 4,407,601 A | | 10/1983 | Reeder | |
| 4,516,756 A | | 5/1985 | Beatty | |
| 4,598,512 A | | 7/1986 | Chapman | |
| 4,803,819 A | | 2/1989 | Kelsey | |
| 4,932,623 A | | 6/1990 | Reisdorff | |
| 4,987,718 A | | 1/1991 | Knight | |
| 5,228,260 A | * | 7/1993 | Dziedzic | E04H 12/24 403/396 |
| 5,661,946 A | * | 9/1997 | Davis | E04H 12/04 248/219.2 |
| 5,799,918 A | * | 9/1998 | Swinderman | B65D 88/66 248/219.1 |
| 5,815,994 A | * | 10/1998 | Knight | E04H 12/2292 52/153 |
| 6,111,553 A | | 8/2000 | Steenbuck | |
| 6,336,620 B1 | | 1/2002 | Belli | |
| 6,378,821 B1 | * | 4/2002 | McKelvy | H02B 5/02 211/107 |
| 7,393,157 B1 | | 7/2008 | Macias | |
| 8,061,666 B1 | | 11/2011 | Fortin et al. | |
| 2004/0084582 A1 | * | 5/2004 | Kralic | H01Q 1/1228 248/219.3 |

* cited by examiner

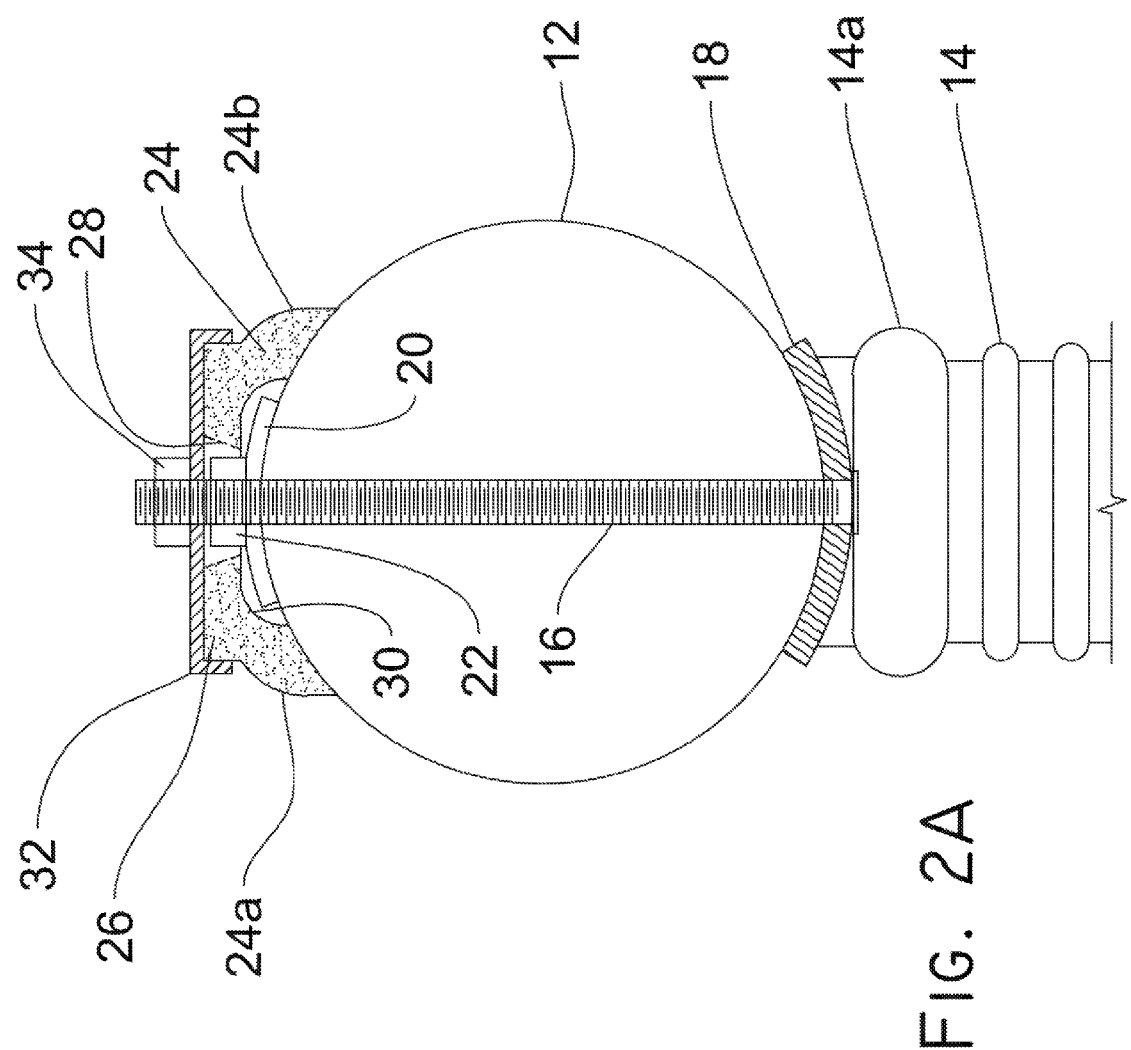

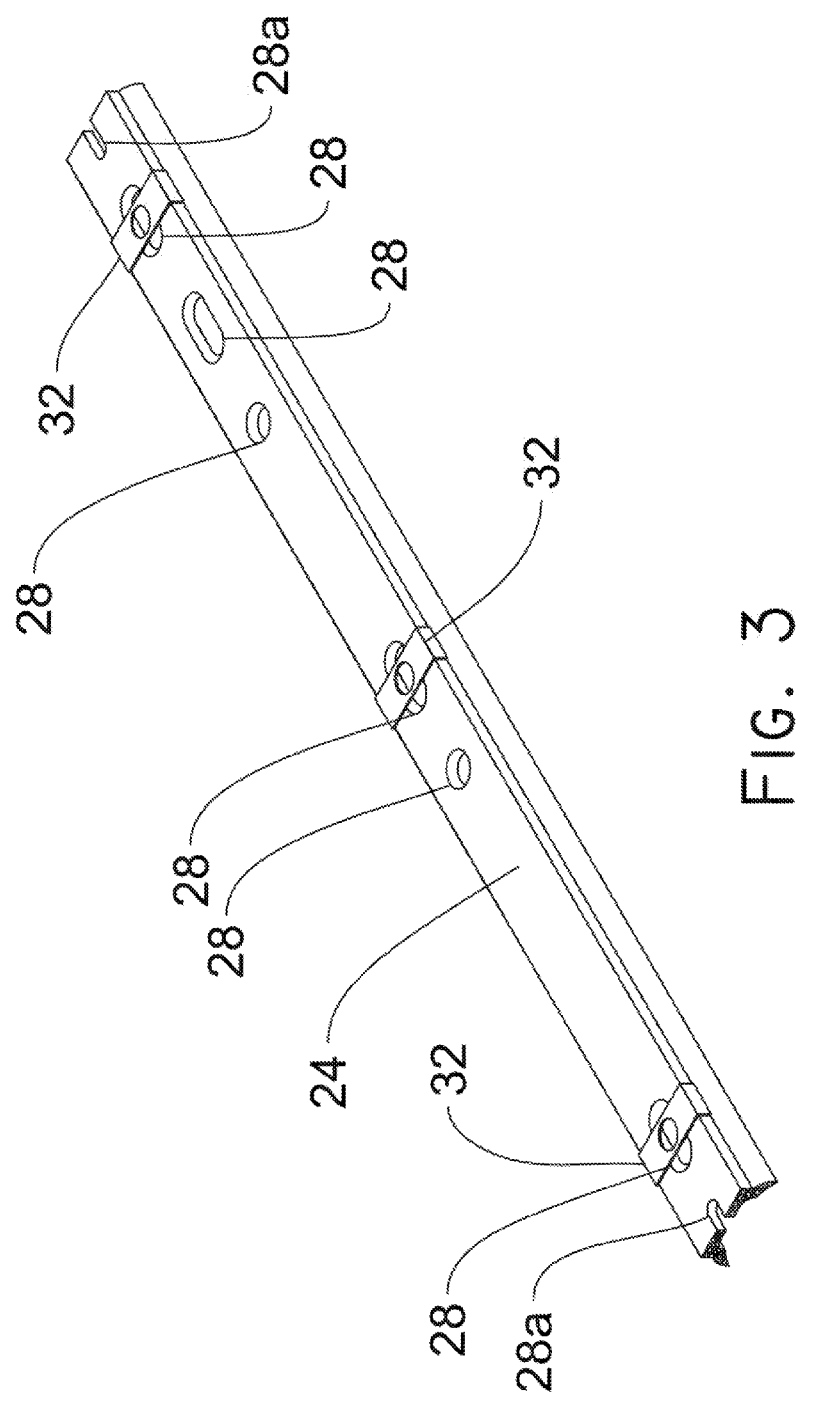

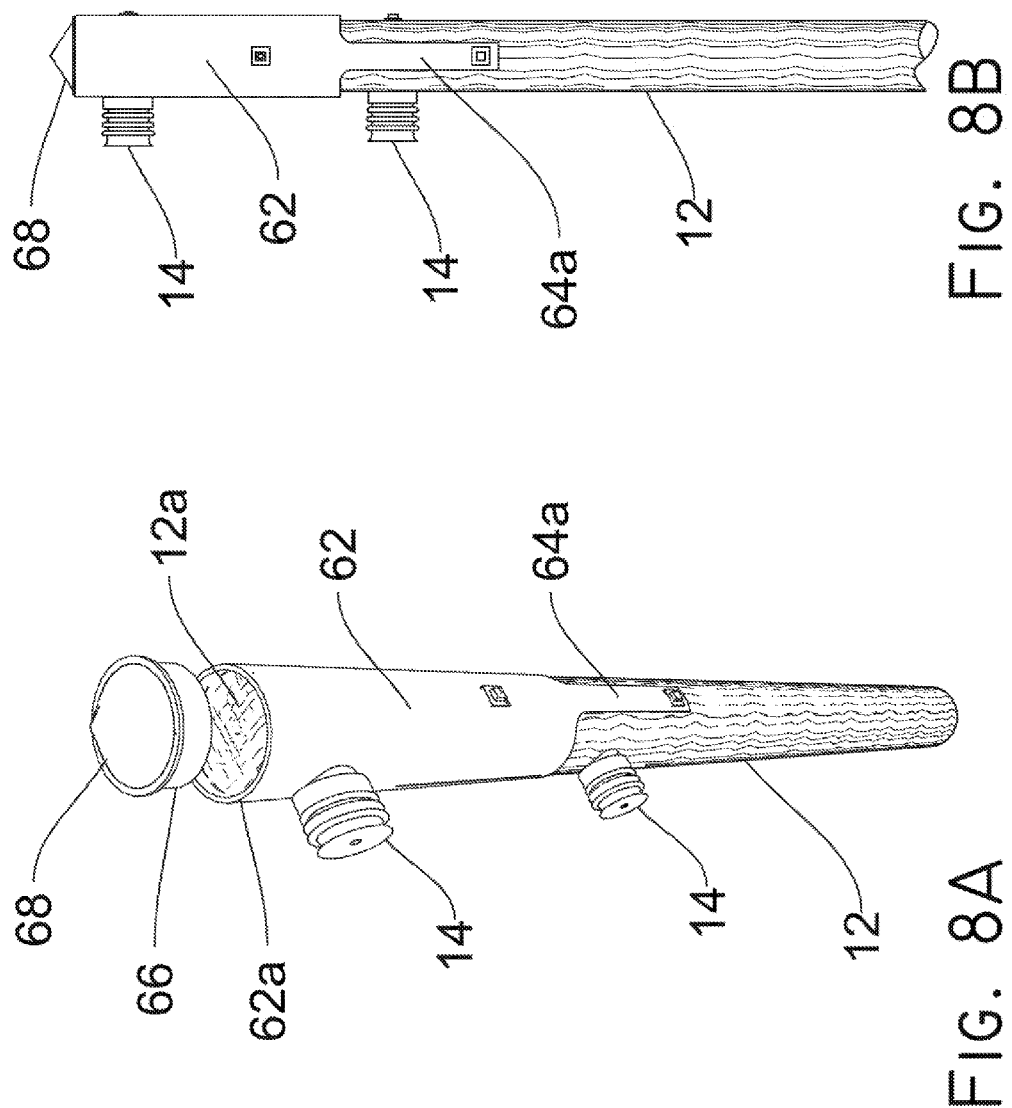

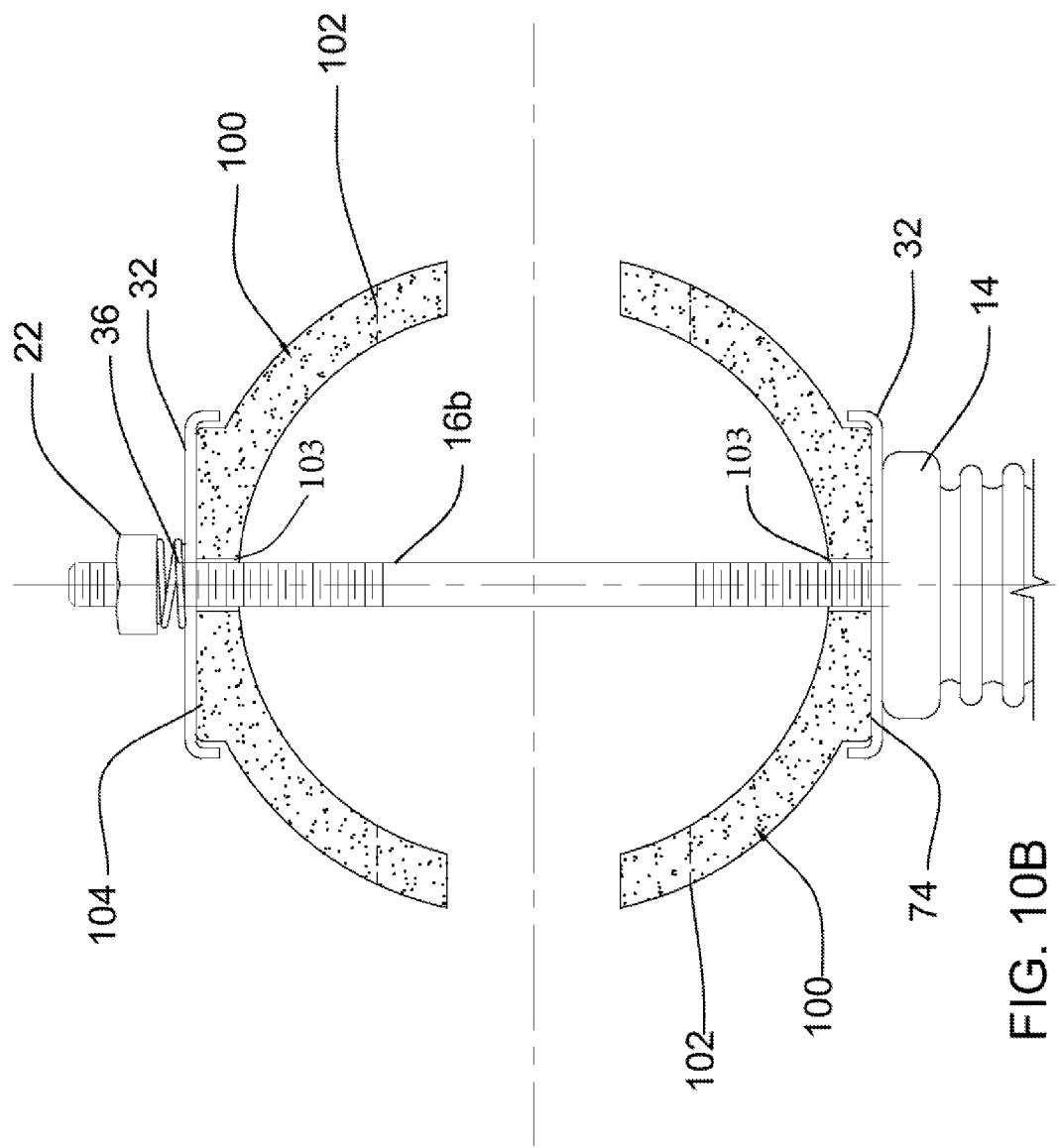

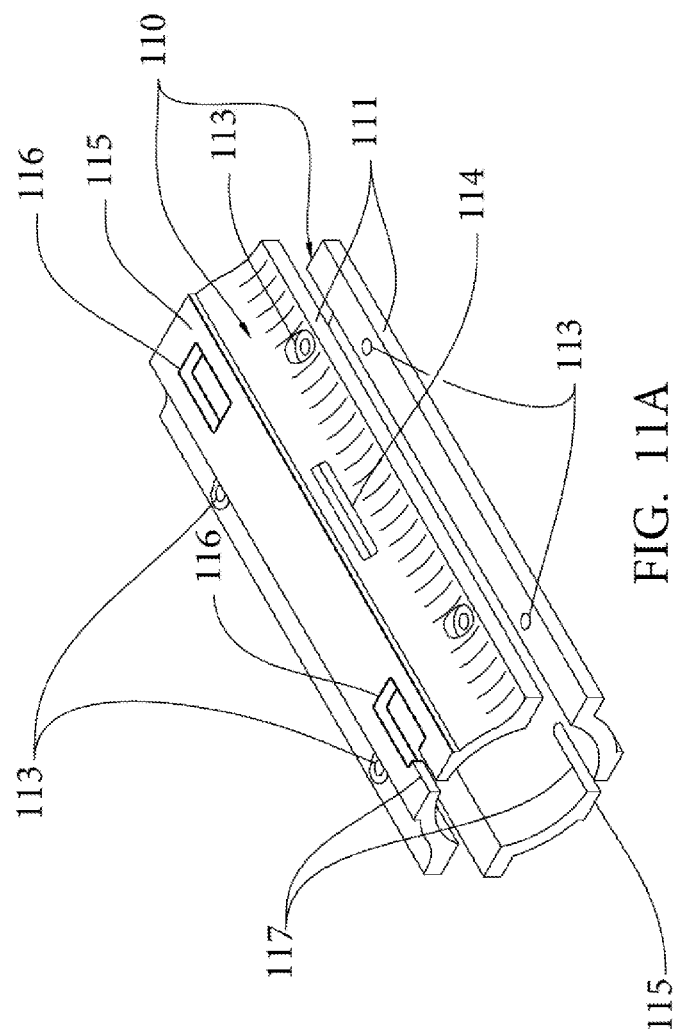

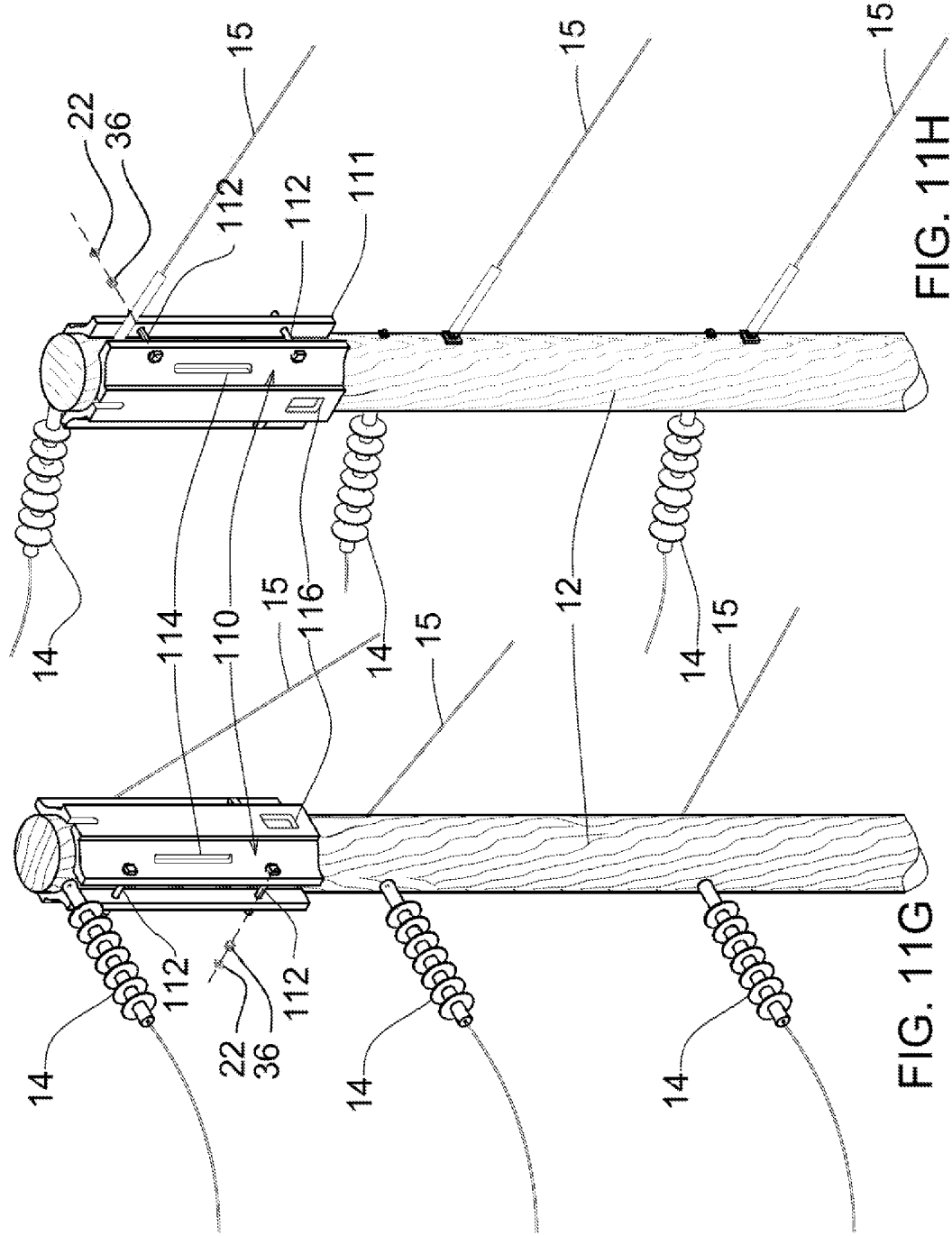

UTILITY OR METER POLE TOP REINFORCEMENT METHOD AND APPARATUS

CROSS-REFERENCE TO RELATED APPLICATIONS

This nonprovisional application is a continuation-in-part of and claims priority to nonprovisional application Ser. No. 15/055,832, entitled "UTILITY OR METER POLE TOP REINFORCEMENT METHOD AND APPARATUS," filed Feb. 29, 2016, which is a continuation-in-part of and claims priority to nonprovisional application Ser. No. 14/624,845, entitled "UTILITY OR METER POLE TOP REINFORCEMENT METHOD AND APPARATUS," filed Feb. 18, 2015, which is a divisional and claims priority to nonprovisional application Ser. No. 14/082,824, entitled "UTILITY OR METER POLE TOP REINFORCEMENT METHOD AND APPARATUS," filed Nov. 18, 2013 by the same inventor.

BACKGROUND OF THE INVENTION

1. Field of the Invention

This invention relates, generally, to repair of upstanding poles such as utility poles. More particularly, it relates to methods and apparatuses for strengthening the tops of poles that have structurally deteriorated over time to avoid or delay the cost of replacing such poles.

2. Description of the Prior Art

Utility poles become degraded over time near the ground and also at their upper end. There are many patented devices for strengthening such poles at or near the ground so that they don't fall over but there has been little inventive activity for strengthening the upper end of such poles to which are connected dedicated voltage transmission/distribution lines as well as telephone/CATV lines.

Meter poles are smaller versions of utility poles; they are positioned near structures such as mobile homes where laws forbid the direct attachment of permanent lines. As used herein, the term "pole" refers to utility as well as meter poles or any other type of pole that may be in need of upper end reinforcement.

The current cost of replacing a utility pole that has lost its structural integrity is about three thousand dollars per pole. Every U.S. state has millions of such poles. There are between one hundred thirty to one hundred eighty million utility poles in use in North America and most utility companies replace about six thousand poles per year. The cost of course is passed along to the consumer.

The upper ends of many pressure-treated poles that were installed in the decade of the 1970s are now losing their structural integrity and are in need of replacement. The same will of course hold true in the future of poles installed in later decades as well. However, it would save companies and consumers substantial monies if those poles could be reinforced instead of replaced.

However, in view of the art considered as a whole at the time the present invention was made, it was not obvious to those of ordinary skill in the art how the upper ends of such poles could be reinforced at a cost substantially less than pole-replacement costs.

SUMMARY OF THE INVENTION

The long-standing but heretofore unfulfilled need for a device that reinforces deteriorating utility poles, meter poles, and the like is now met by a new, useful, and non-obvious invention.

The inventive structure is an apparatus for reinforcing an upstanding pole having an upper end that is worn, rotted, damaged, or otherwise in a deteriorated state.

The novel structure includes an elongate brace and at least two bolt-accommodating openings formed in the elongate brace. Each bolt-accommodating opening is centered on a longitudinal axis of symmetry of the elongate brace. The elongate brace is adapted to bear against the upstanding pole near the worn upper end of the upstanding pole.

At least two washer plates are disposed in overlying relation to the elongate brace and a bolt-accommodating opening is formed in each washer plate. The bolt-accommodating opening is centered on a longitudinal axis of symmetry of each washer plate and is aligned with a bolt-receiving opening formed in the elongate brace.

At least two elongate bolts are adapted to extend diametrically through the upstanding pole. Each elongate bolt extends through a preselected bolt-accommodating opening formed in the elongate brace and through the bolt-accommodating opening formed in the associated washer plate.

Each elongate bolt has a tool-engageable head and a free end that extends outwardly from the upstanding pole diametrically opposite from the tool-engageable head. A nut screw-threadedly engages the free end of each elongate bolt and advancement of the nut increasingly secures the associated washer plate to the elongate brace and therefore increasingly secures the elongate brace to the upstanding pole so that the upper end of the upstanding pole is reinforced by the elongate brace.

The elongate brace has a base and a pair of laterally spaced apart legs are formed integrally with the base. The legs are adapted to bear against the upstanding pole.

At least one cavity for accommodating a pre-existing, conventional washer is formed in the elongate brace in open communication with each bolt-accommodating opening. Each elongate bolt extends through the conventional washer-accommodating opening when the nut secures said washer plate to said elongate brace.

In a second embodiment, each washer plate has a recessed channel formed therein, centered on the longitudinal axis of symmetry of the washer plate. The recessed channel extends into an associated bolt-receiving opening and a spring lock is disposed in overlying relation to a bottom wall of the recessed channel. A nut screw-threadedly engages the free end of the elongate bolt in bearing relation to the spring lock so that advancing the nut increasingly urges the washer plate towards the elongate brace and therefore increasingly presses the elongate brace against the upper end of the upstanding pole.

In a third embodiment, each washer plate has a raised ridge formed therein, centered on the longitudinal axis of symmetry of the washer plate, said longitudinal axis of symmetry being coincident with the longitudinal axis of symmetry of the elongate brace.

In the third embodiment, a first spring lock is disposed in each bolt-accommodating opening formed in the elongate brace and a first nut is screw-threadedly engaged to the free end of the elongate bolt in bearing relation to the first spring lock. The elongate ridge is disposed in overlying relation to the first nut and a second spring lock is disposed in overlying relation to the elongate ridge. A second nut screw-threadedly engages the free end of the elongate bolt in bearing engagement to the second spring lock so that advancement of the first and second nuts enables each washer plate to bear increasingly against the elongate brace and thus cause the elongate brace to bear increasingly against the upper end of the pole, thereby reinforcing it.

All three embodiments include an elongate front support member that is arcuate in transverse section to conform to the surface of the pole and which is mounted on the upper end of the pole in diametric relation to the elongate brace so that the damaged upper end of the upstanding pole is sandwiched between the front support member and the elongate brace.

At least two openings are formed in the front support member to accommodate the elongate bolts that secure the front support member to the upstanding pole. The elongate bolt that extends through the elongate brace and washer plate is the same elongate bolt that extends through the preselected opening formed in the front support member, i.e., the elongate bolts secure the front support member to a first side of the pole and secure the elongate brace to a second, diametrically opposed side of the pole so that the upper end of the pole is sandwiched between the front support member and the elongate brace.

A fourth embodiment of the invention is an apparatus for supporting a horizontally disposed cross arm mounted to an upstanding pole. It includes a first vertical part that is adapted to be secured to the pole and a horizontal part formed integrally with the first vertical part at an upper end of the first part.

The horizontal part extends away from the pole and has a depth substantially equal to a depth of the cross arm.

A second vertical part is formed integrally with the horizontal part at a free end of the horizontal part and projects upwardly therefrom.

The horizontal part is adapted to abut and support a bottom wall of the cross bar and the second vertical part is adapted to abut a front wall of the cross bar to prevent rotation of the cross bar in a horizontal plane about a longitudinal axis of the pole.

An elongate brace is adapted to abut the pole in diametrically opposed relation to the cross arm support member and an aperture is formed in the first vertical part of the cross arm support member to receive a bolt that extends diametrically through the pole to secure the first vertical part and hence the cross arm support member to the pole.

A fifth embodiment of the invention is a prosthetic apparatus for reinforcing a deteriorating top of an upstanding pole. It includes a cylindrical main body having an upper rim at a first end of the main body. A pair of legs depends from a second end of the main body in diametrically opposed relation to one another.

A plurality of apertures is formed in the cylindrical main body in circumferentially and longitudinally spaced relation to one another to facilitate attachment of the cylindrical main body and the legs to the pole.

The upper rim projects above an uppermost end of the upstanding pole when the uppermost end is ensleeved by the cylindrical main body.

A top cap has a skirt having a length substantially equal to a distance of the upper rim above the uppermost end of the upstanding pole so that the skirt fits within the hollow interior of the cylindrical main body when the top cap engages the cylindrical main body.

An embodiment of the prosthetic apparatus includes a cylindrical main body having an insulator cutout in a second end of the main body in diametrically opposed relation to a bolt receiving channel and a bolt access aperture, wherein the bolt receiving channel extends between the second end of the main body and the bolt access aperture. The first end of the main body main body includes a first pair of diametrically opposed apertures formed in the main body and adapted to receive an insulator through bolt for securing an insulator to the main body.

An embodiment may include a second and third pair of diametrically opposed apertures. The second pair is disposed near the first end of the main body while the third pair is disposed near the second end of the main body. Both the second and third pairs are perpendicular with respect to the first pair and are adapted to receive a support through bolt for securing the main body to the upstanding pole.

An embodiment may include an open pole access disposed in the main body and circumferentially spaced at least 90 degrees in any direction from an intended location of the insulator when the apparatus is secured to the upstanding pole. The open pole access provides an attachment point for securing equipment directly to the upstanding pole.

An embodiment may include a first and second pair of diametrically opposed stringers tangentially integrated into an outer surface of the main body. The stringers include a flat rectangular surface extending along the extent of the main body. This embodiment includes the first pair of diametrically opposed apertures, the bolt receiving channel, and the bolt access aperture disposed in the first pair of diametrically opposed stringers. In addition, the second and third pair of diametrically opposed apertures are disposed in the second pair of diametrically opposed stringers.

A general object of this invention is to lengthen the lifetime of upstanding poles such as a utility poles owned by a public or private utility company or meter poles of the type used in connection with mobile homes.

A more specific object is to reinforce the upper end of such poles at a cost that is much less than the cost of replacing such a pole.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the nature and objects of the invention, reference should be made to the following detailed disclosure, taken in connection with the accompanying drawings, in which:

FIG. 2A is a sectional view taken along line 2A-2A in FIGS. 1A and 1B;

FIG. 3 is a perspective view of the back support brace of the first, second, and third embodiments;

FIG. 8A is a partially exploded perspective view of the first embodiment of the pole prosthesis when installed on a pole;

FIG. 8B is a perspective view of the first embodiment of the pole prosthesis when installed on a pole;

FIG. 10B is an end view of the third embodiment of the pole prosthesis having a first embodiment of a washer and through bolt connection;

FIG. 11A is a perspective view of a fourth embodiment of the pole prosthesis

FIG. 11G is a perspective view of the fourth embodiment when installed on a dead end pole; and FIG. 11H is a perspective view of the fourth embodiment when installed on a dead end pole.

DETAILED DESCRIPTION OF THE PREFERRED EMBODIMENT

Figure 1A:
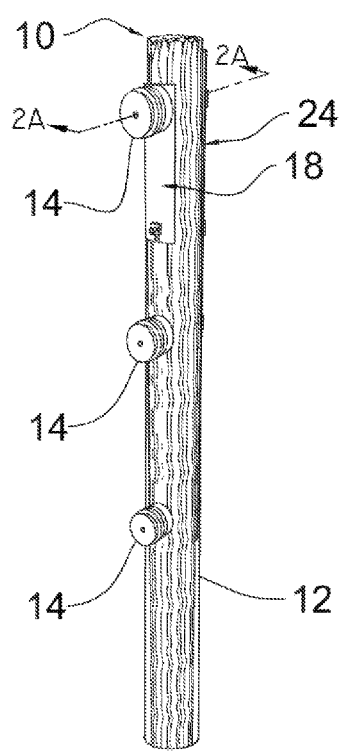
FIG. 1A is a front perspective view of a first embodiment.
Figure 1B:
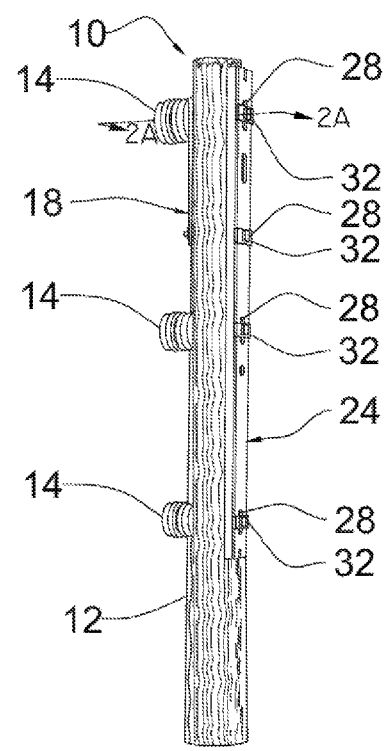
FIG. 1B is a rear perspective view of the first embodiment.

FIGS. 1A and 1B depict a first illustrative embodiment of the novel structure, denoted 10 as a whole, when installed on a utility or meter pole 12 having at least one insulator 14 secured thereto. The structure is perhaps more fully disclosed in FIG. 2.

In FIG. 2A, conventional insulator 14 having base 14a is secured to pole 12 near the uppermost end thereof by elongate bolt 16. Front support 18 conforms to the shape of pole 12 and its upper end provides support for insulator base 14a. Front support 18 has an elongate vertical extent as depicted in FIGS. 1A and 1B.

Conventional, pre-existing washer 20 near the top of FIG. 2A has an arcuate shape to conform to the shape of pole 12 and is held against the pole by conventional, pre-existing nut 22. Said washer and nut are diametrically opposed to conventional, pre-existing insulator base 14a.

The novel structure includes elongate brace 24 having laterally spaced apart legs 24a, 24b that bear against the top of pole 12 in diametrically opposed relation to elongate front plate 18 as depicted. Legs 24a, 24b are formed integrally with base 26 of elongate brace 24. At least two bolt-accommodating openings 28 are formed in said base 26, said openings being centered on a longitudinal axis of symmetry of said elongate brace. Each opening 28 is in open communication with an associated washer-accommodating opening 30. A plurality of openings 28 is formed along the vertical extent of elongate brace 24 as indicated in FIG. 1B. Each opening 28 may be provided as a circular opening or as an elongate slot as indicated in said FIG. 1B and as indicated in FIG. 3 as well.

Reinforcing base 26 is square at its outer or outboard surface, i.e., the surface that does not contact pole 12. Washer plate 32 conforms to that square configuration and overlies said outer surface as depicted. Nut 34 screw-threadedly engages bolt 16 and secures washer plate 32 and hence brace 24 to the top of the pole in diametric opposition to insulator 14 and elongate front support 18. Each washer plate 32 thus performs the function of a washer.

Said elongate brace 24 and washer plates 32 are depicted in perspective view in FIGS. 1A and 3. Openings 28 are provided in plural locations in both circular and slotted form to accommodate various pole structures. Open slots 28a at the opposite ends of elongate brace 24 are used to accommodate pre-existing bolts as needed.

It will be observed in the embodiment of FIG. 2A that each nut 34 is provided at the time of pole repair, i.e., conventional nut 22 remains in its original position.

Figure 4:
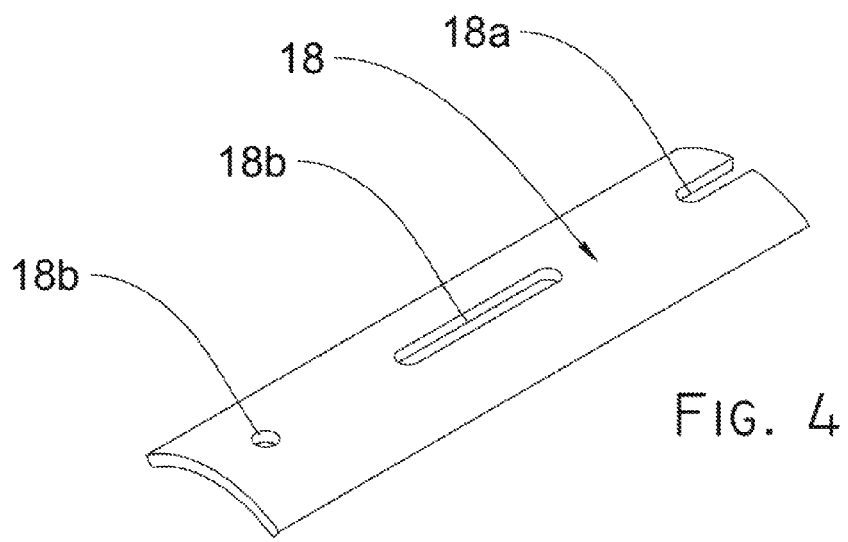
FIG. 4 is a perspective view of the elongate front support that is common to the first three embodiments.

Novel front support 18, depicted in FIGS. 1A, 1B, and 4 has an elongate structure. It has a first end that underlies insulator 14 and a second end that is longitudinally spaced apart from the first end and which therefore does not underlie the insulator.

Front support 18 is arcuate in transverse section and its upper end is slotted as at 18a to accommodate elongate bolt 16, which is not depicted in FIG. 4. Circular or slotted openings 18b are formed therein as depicted to accommodate bolts as needed for fastening front support 18 to the front or insulator side of pole 12.

Front support 18 and elongate brace 24, which provides back support, are disposed in diametrically opposed relation to one another and hold pole 12 in sandwiched relation between them.

Figure 2B:
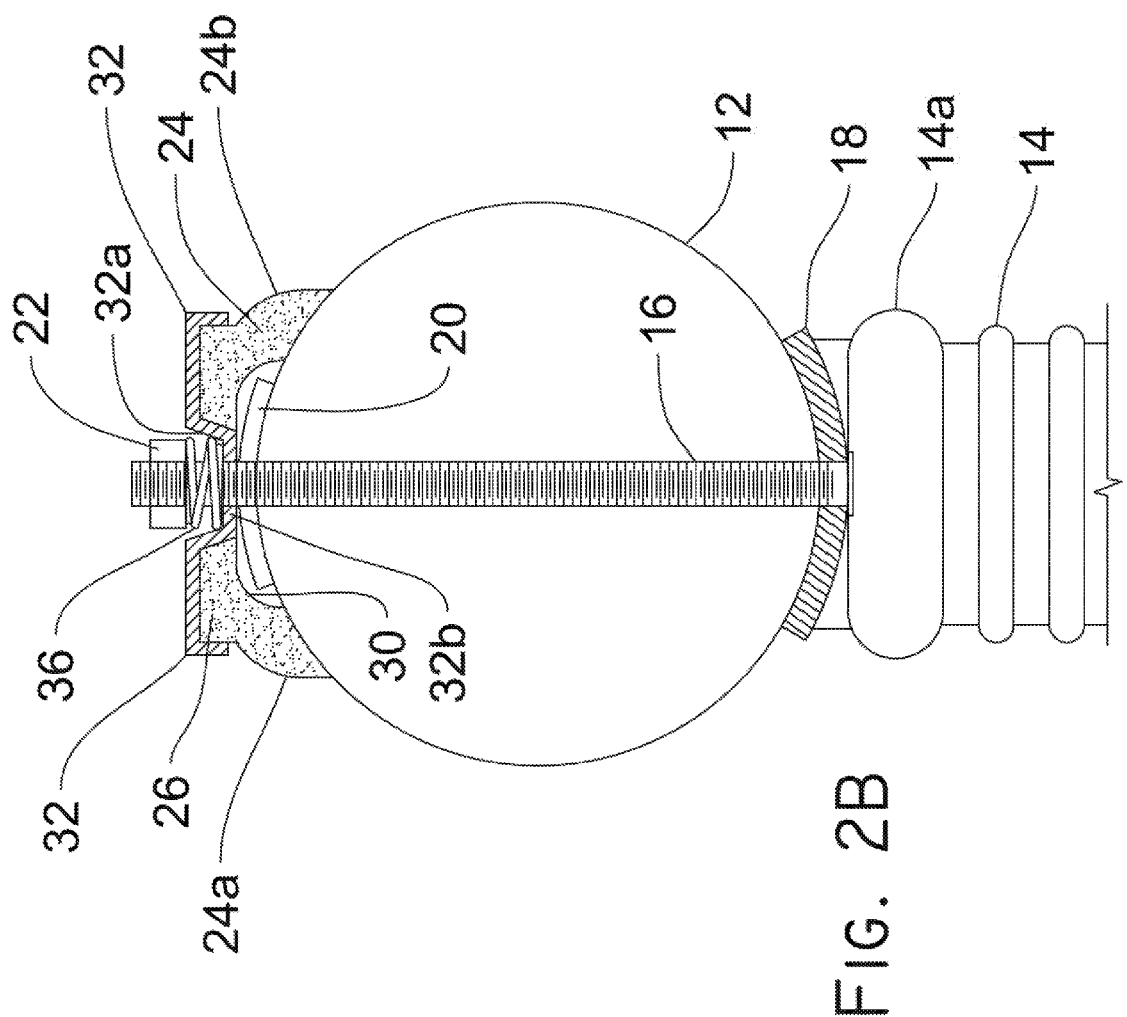
FIG. 2B is a view similar to the sectional view of FIG. 2A but depicts a second embodiment.

FIG. 2B depicts a second embodiment where conventional nut 22 is removed from bolt 16 and then re-engaged thereto. In this second embodiment, each washer plate 32 has a recessed channel 32a formed in the center thereof as depicted. Channel 32a includes centrally-apertured bottom wall 32b and said bottom wall is substantially flush with washer-accommodating opening 30. Bottom wall 32b thus performs the function of a washer and reinforces conventional washer 20

Each spring lock 36 fits within channel 32a and abuts channel bottom plate 32b. Conventional nut 22 is returned to its screw-threaded engagement with bolt 16 to bear against spring lock 36. This second embodiment has the advantage of not requiring second nut 34 of the first embodiment.

Figure 2C:
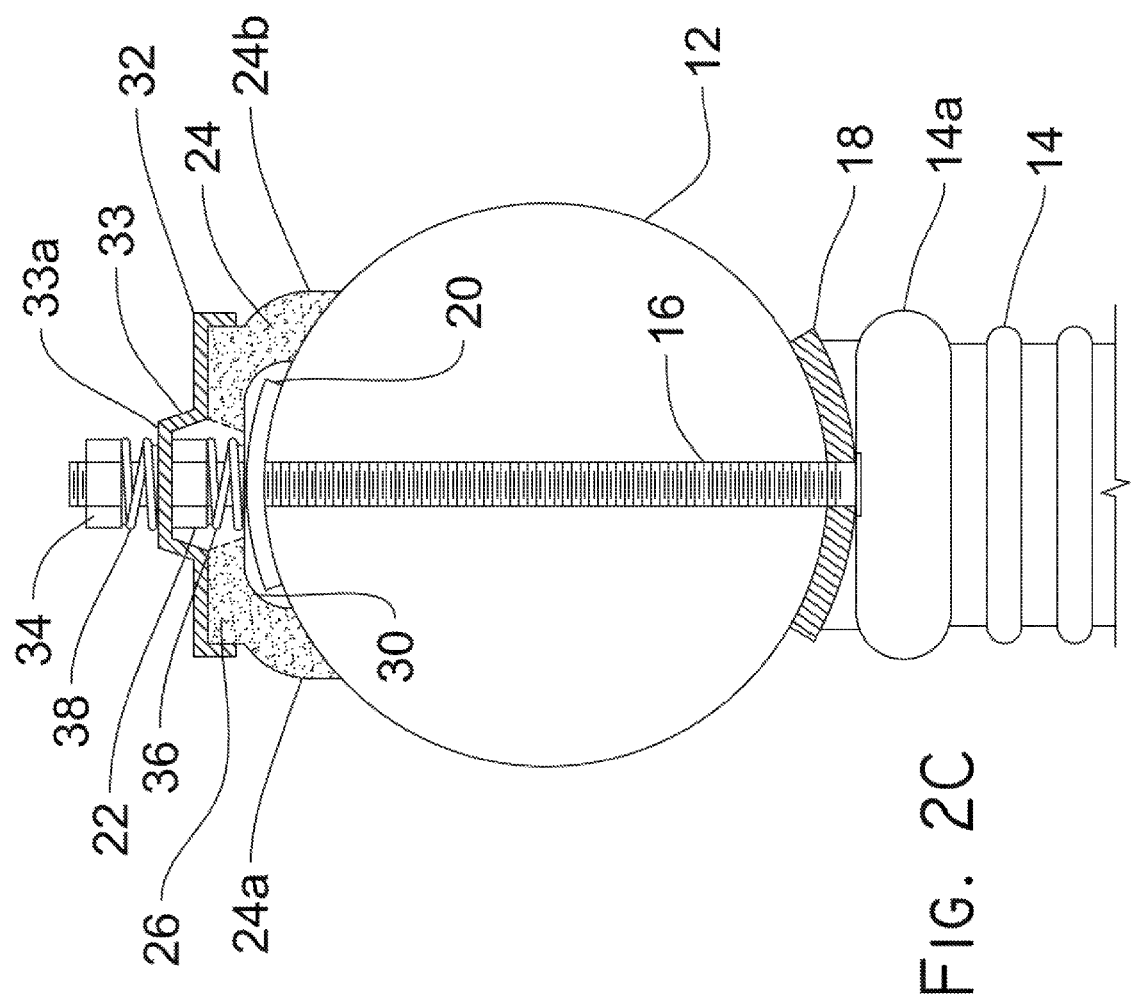
FIG. 2C is a view similar to the sectional view of FIG. 2A but depicts a third embodiment.

FIG. 2C depicts a third embodiment where conventional nut 22 remains as in the first embodiment in screw-threaded engagement with bolt 16, and where additional nut 34 of the first embodiment is also used.

In this third embodiment, each washer plate 32 has a raised ridge 33 that includes centrally-apertured top wall 33a as depicted in FIG. 2C. Conventional nut 22 and spring lock 36 are disposed in bearing relation to conventional washer 20. Each washer plate 32 is then placed into overlying relation to base 26 of elongate brace 24 in registration with each opening 28 as needed. A second spring lock 38 is placed into overlying relation to each top wall 33a and is secured thereto by a nut 34.

Figure 5:
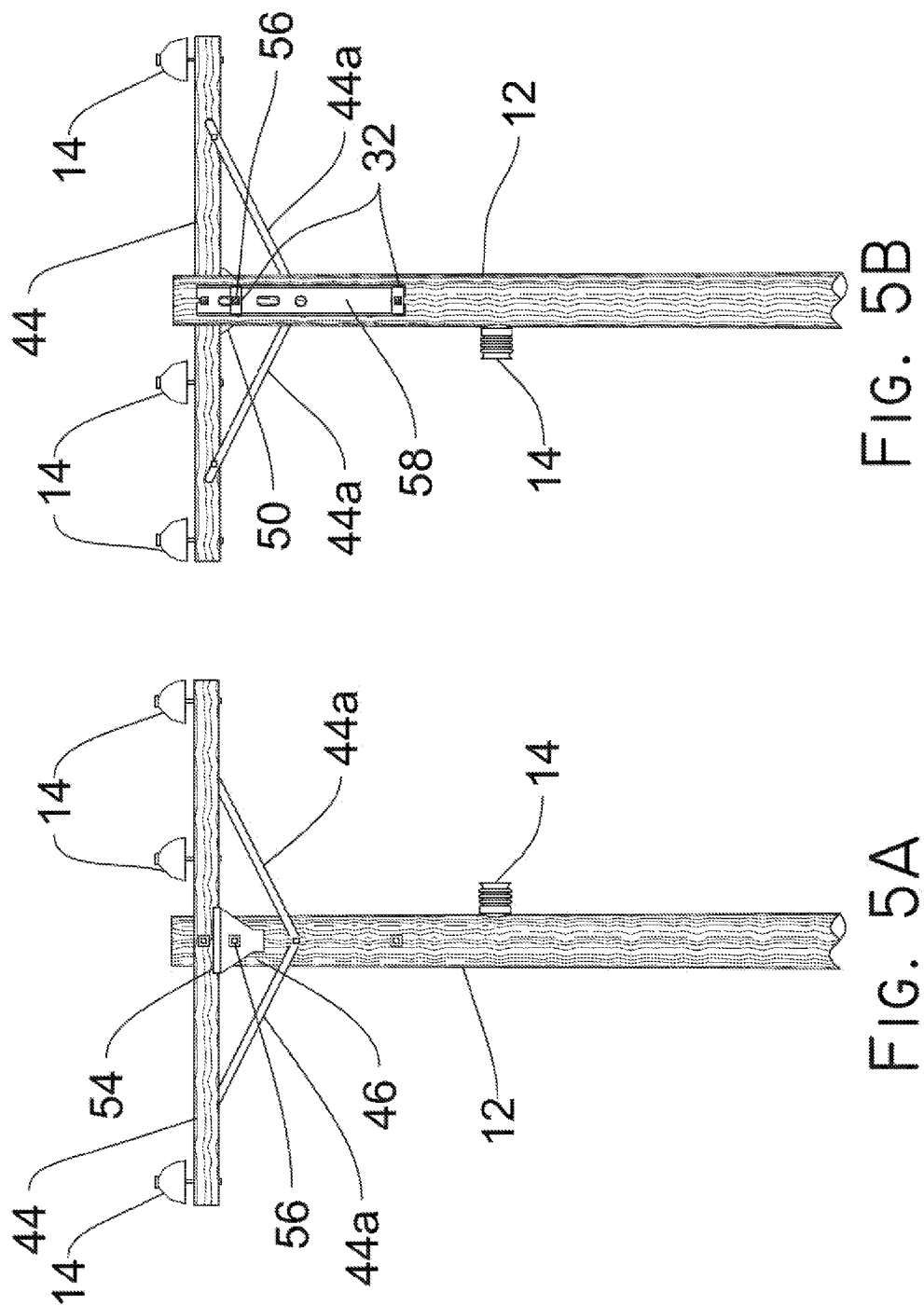
FIG. 5A is a front elevational view of an embodiment of a cross-arm support.
FIG. 5B is a rear elevational view of the embodiment in FIG. 5A.
Figure 6:
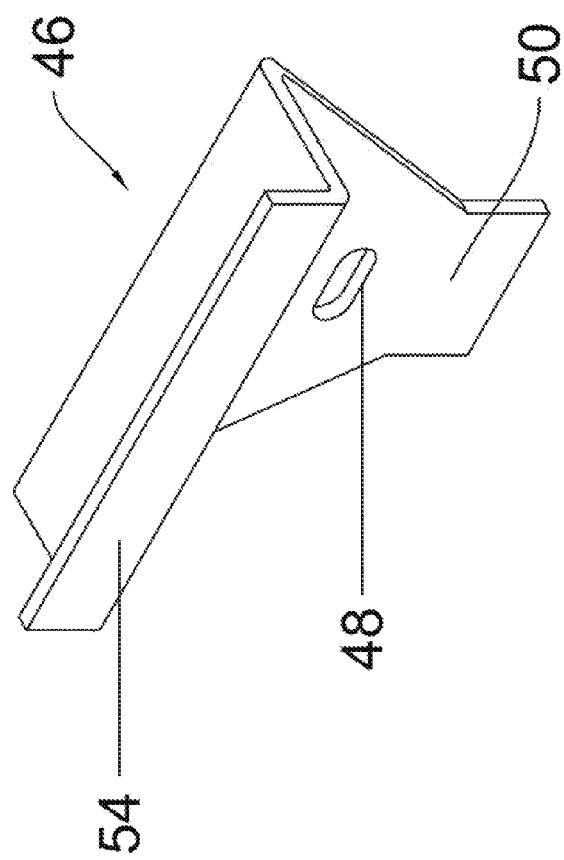
FIG. 6 is a perspective view of the novel cross arm support member shown in FIG. 5A.

A fourth embodiment is depicted in FIGS. 5A, 5B, and 6. This embodiment has utility in connection with upstanding poles 12 having a cross arm 44, with or without braces 44a. The perspective view of FIG. 6 depicts cross arm support member 46. Aperture 48 is formed in first vertical part 50 and may take the form of a circular opening or an elongated slot as depicted. A first ninety-degree bend forms horizontal part 52 and a second ninety-degree bend forms second vertical part 54 which serves as a detent.

As depicted in FIG. 5A, bolt 56 is inserted into pole 12 through aperture 48 to secure cross arm support 46 to said pole. Cross arm support 46 is positioned on pole 12 so that horizontal part 52 serves as a support surface for cross arm 44 at the mid-length region of said cross arm. Horizontal support surface 52 has a depth substantially equal to a depth of cross arm 44 so that detent 54 overlies a front surface of cross arm 44 at least to some extent. Horizontal support surface 52 provides support for cross arm 44 and inhibits rotation of said cross arm in a vertical plane and detent 54 holds cross arm 44 so that said cross arm cannot rotate in a horizontal plane about the vertical axis of pole 12.

As depicted in FIG. 5B, bolt 56, which secures cross arm support 46 to pole 12 preferably extends diametrically through the pole and when used with a suitable nut and washer secures elongate brace 58 to the rear side of pole 12. Further bolts may be used to further secure said elongate brace 58 to pole 12, said brace 58 being provided with multiple apertures along its extent and slots at its opposite ends for that purpose. The sandwiching of pole 12 between cross arm support 46 and elongate brace 58 provides a heretofore unknown degree of support to cross arm 44.

Figure 7:
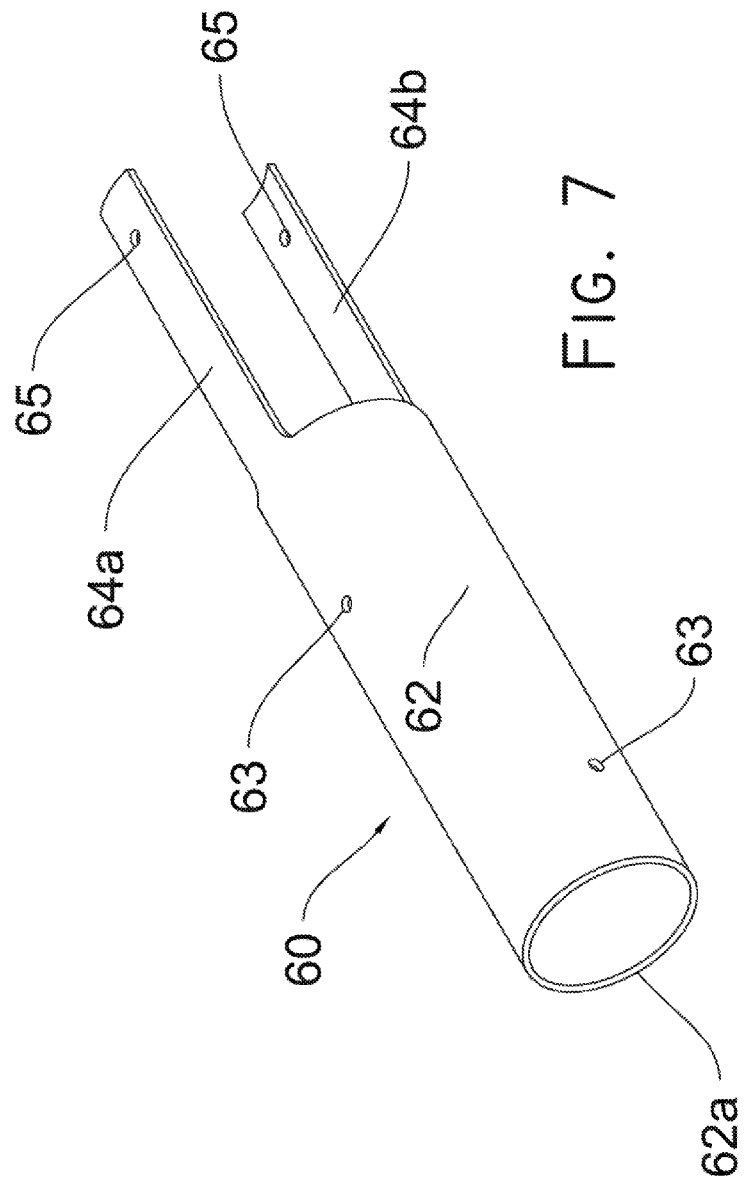
FIG. 7 is a perspective view of a first embodiment of a pole prosthesis.

A fifth embodiment is depicted in FIGS. 7, 8A and 8B. Main body 62 of brace 60 is cylindrical. Legs 64a, 64b depend from cylindrical main body 62 in diametrically opposed relation to one another. The upper rim of main body 62 is denoted 62a. Apertures collectively denoted 63 are formed in cylindrical main body 62 in circumferentially and longitudinally spaced relation to one another and apertures collectively denoted 65 are formed in legs 64a, 64b.

As depicted in FIG. 8A, upper rim 62a of cylindrical main body 62 projects above the uppermost end 12a of pole 12 when brace 60 is properly installed in ensleeving relation to a pole top. Skirt 66 of top cap 68 has a length equal to or just slightly less than the distance of rim 62a above pole top 12A so that said skirt fits within the hollow interior of cylindrical main body 62 when top cap 68 is in its functional position as depicted in FIG. 8B. The diameter of skirt 66 causes it to fit tightly with a good friction fit within said hollow interior so that high winds cannot cause it to separate from said functional position. Various bolts or screws extend through apertures 63 and 65 to secure brace 60 to pole 12.

Figure 9A:
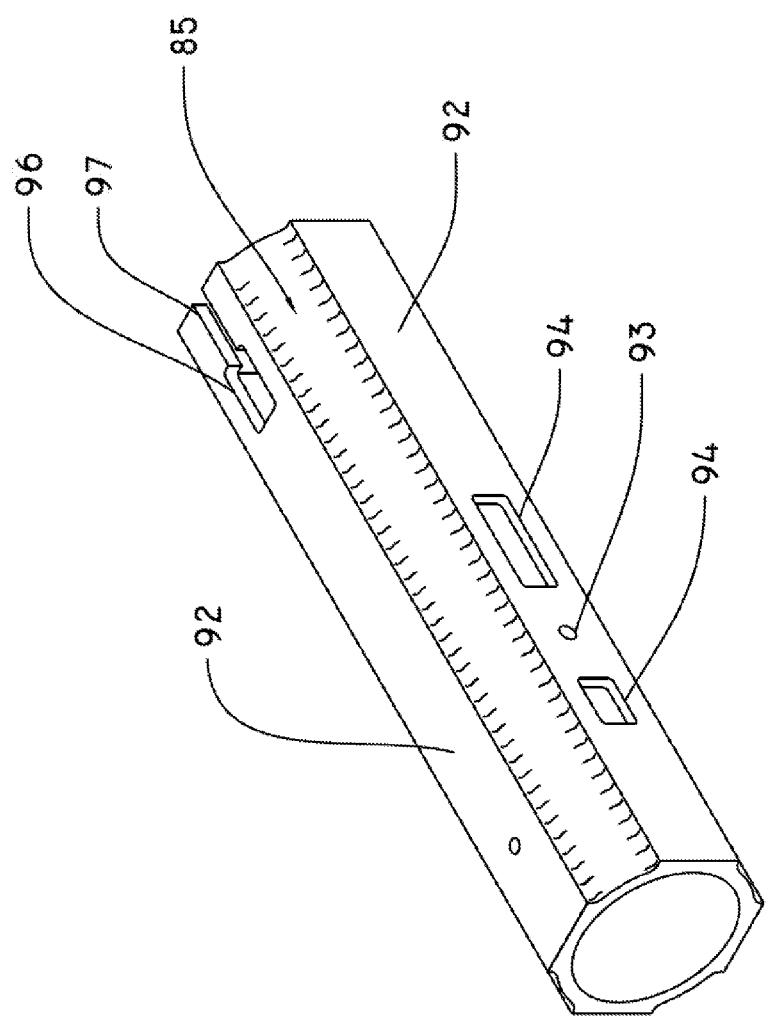
FIG. 9A is a perspective view of a second embodiment of the pole prosthesis.
Figure 9B:
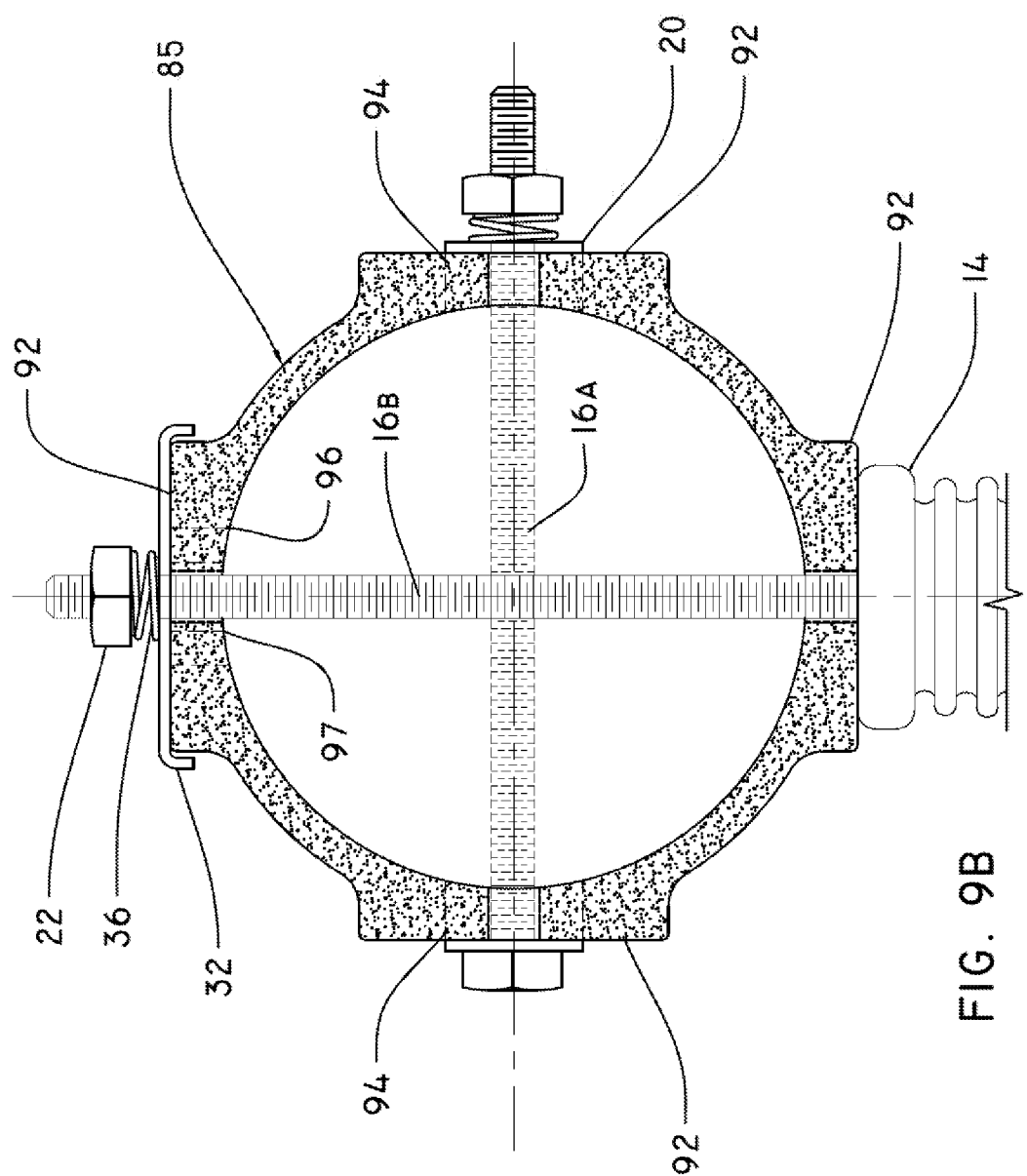
FIG. 9B is an end view of the second embodiment of the pole prosthesis.

Referring now to FIGS. 9A-9D, an embodiment includes main body 85 having an effective length between 24 and 120 inches. Because utility poles often include insulators spaced between 24 and 120 inches, the disclosed range guarantees that the present invention will reinforce the connection of at least two of the uppermost insulators to a utility pole. Main body 85 further includes four vertically disposed stringers 92 tangentially integrated in to main body 85 on the outer or outboard surface, i.e., the surface that does not contact pole 12. Stringers 92 provide increased structural support while also providing a flat surface to more easily mate objects to the surface of the prosthetic. As shown in FIG. 9B, washers 20, washer plates 32, and insulators 14 are able to more easily mate with flat stringers 92 than would be possible on a curved surface.

Stringers 92 also provide additional flat space for easily attaching equipment that is typically found on utility poles, such as lightening arrestors and fuses. Some equipment, however, such as dead-end insulators or down Guys (an anchor wire), must be secured to the wooden pole. Therefore, main body 85 includes open pole accesses 94 for attaching such equipment to wooden pole 12. Open pole accesses 94 can be located on any of the stringers; however, it is beneficial to have open pole accesses located on one of the three stringers 92 not in contact with insulators 14 to provide easy access to the equipment received through open pole accesses 94 without having to avoid contacting electrical wires strung from insulators 14.

Main body 85 preferably includes four stringers 92 circumferentially spaced 90 degrees apart from each other with several through bolt apertures. This arrangement allows for the application of support through bolts 16a in perpendicular relation to insulator through bolts 16b with both types of bolts 16a, 16b passing through stringers 92. The perpendicular relation of through bolts 16a, 16b provides greater rigidity than is possible when the through bolts are aligned in a single plane. The increased rigidity is of particular importance when the pole top consists of rotten and deteriorated wood.

Figure 9D:
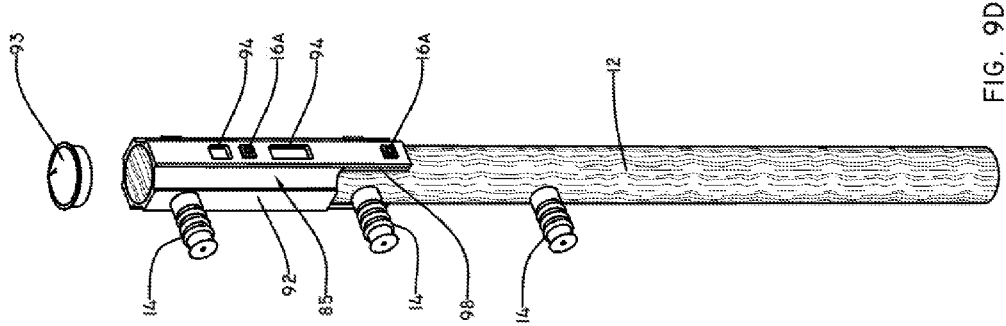
FIG. 9D is a perspective view of the second embodiment of the pole prosthesis installed on a pole.
Figure 9C:
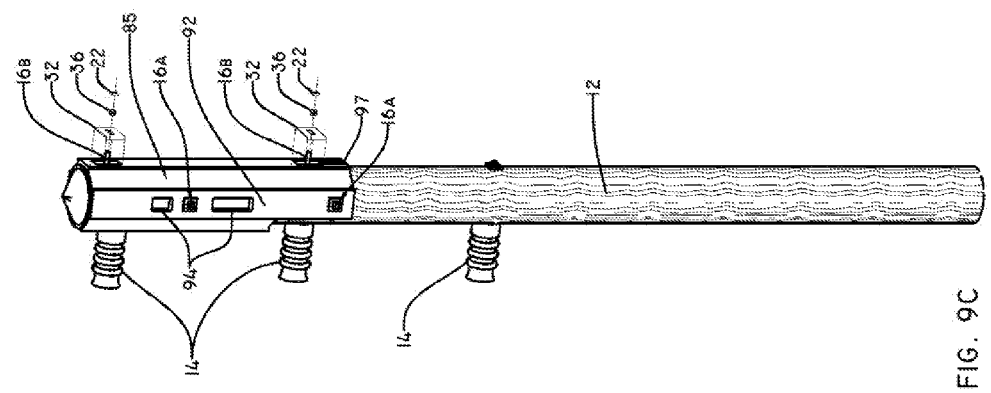
FIG. 9C is a perspective view of the second embodiment of the pole prosthesis installed on a pole.

As shown in FIGS. 9C and 9D, support through bolts 16a are longitudinally spaced with respect to each other along the vertical extent of main body 85 to provide greater stability along the length of pole 12. In addition, the perpendicular relation of support through bolts 16a with respect to insulator through bolts 16b provides the benefit of allowing an installer to more easily avoid contacting the high voltage wires strung from insulator 14 when installing support through bolts 16a.

As shown in FIG. 9D, an embodiment includes cutout 98 in the lower end of main body 85, wherein cutout 98 is adapted to receive a previously installed insulator 14. Cutout 98 is preferably between 12 and 24 inches in length to compensate for variations in the location of the lower insulator.

Main body 85 further includes bolt access 96 and bolt channel 97 diametrically opposed to cutout 98. Bolt access 96 is in open communication with open bolt channel 97. Open bolt channel 97 and cutout 98 work in conjunction to slide main body 85 down and around an installed insulator 14 without requiring the prosthetic installer to remove the insulator. Bolt channel 97 receives the bolt while cutout 98 receives the insulator secured to the bolt, as shown in FIGS. 9C and 9D. Once the prosthetic is properly in place with the bolt access 96 in receipt of an insulator through bolt 16b, washer plate 32 receives the insulator through bolt 16b and is secured in overlying position with respect to stringer 92 as depicted in FIGS. 9B and 9C. Nut 22 screw-threadedly engages insulator through bolt 16b and secures washer plate 32, and hence, insulator 14 to main body 85. Each washer plate 32 thus performs the function of a washer.

In addition, spring lock 36 is preferably disposed between washer plate 32 and nut 22. Conventional nut 22 is screw-threadedly engaged with insulator through bolt 16b to bear against spring lock 36 and secure insulator 14 to main body 85. Securing insulator 14 to main body 85 has the additional benefit of reinforcing a potentially compromised attachment of insulator 14 to a rotted pole top.

In an embodiment, bolt channel 97 is of a width large enough to receive an existing nut secured to the insulator through bolt 16b, so that an installer of the prosthetic does not need to remove the nut prior to sliding insulator through bolt 16b through bolt channel 97. Washer plate 32 can then be secured overtop the existing nut to secure insulator through bolt 16b to main body 85 without having to remove the existing nut. In addition, bolt access 96 is preferably large enough to accommodate the necessary tools for removing an existing attachment means from the insulator through bolt 16b if necessary.

In an embodiment, stringers 92 may have a height, extending in the outboard direction when in end view, that is greater than or equal to the height of a nut that is typically used to secure insulators to utility poles. As a result, the existing nut will not impair washer plate 32 from directly mating to stringer 92. In another embodiment, washer plate 32 may contain the design shown in FIG. 2C, which includes adequate spacing for an existing nut that protrudes beyond the height of stringer 92. Plate 32 is preferably less than or equal to the height, i.e. in the longitudinal direction of the main body, of the bolt access 96. Plate 32 having the design shown in FIG. 2C can then be flipped around and top wall 33a will slide into bolt access 96. This functionality is particularly useful when bolt 16b does not protrude substantially beyond bolt access 96 and washer plate 32 must butt up against pole 12 in order to secure nut 22 to bolt 16b.

Figure 10A:
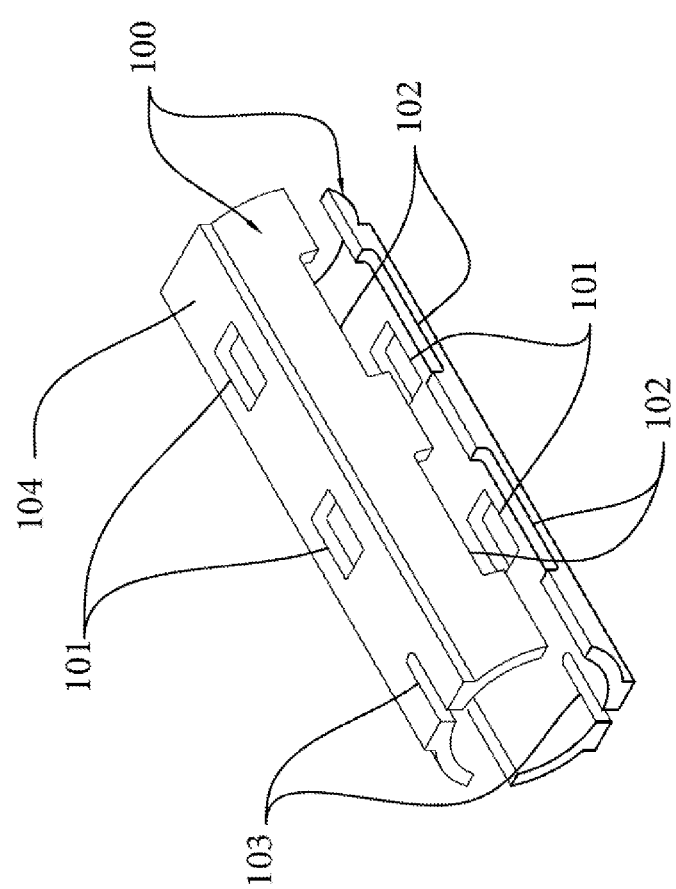
FIG. 10A is a perspective view of a third embodiment of the pole prosthesis
Figure 10C:
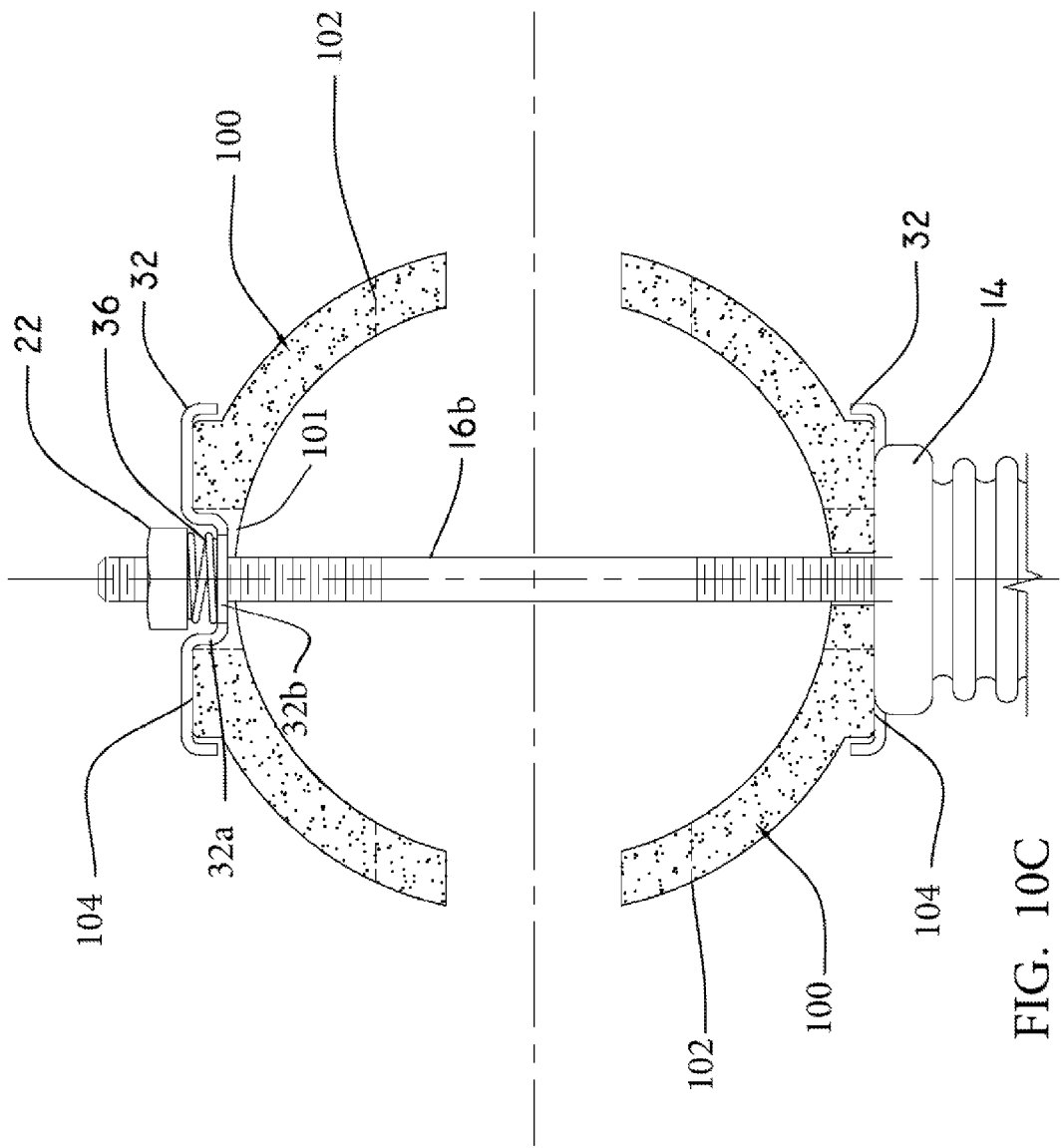
FIG. 10C is an end view of the third embodiment of the pole prosthesis having a second embodiment of a washer and through bolt connection.
Figure 10D:
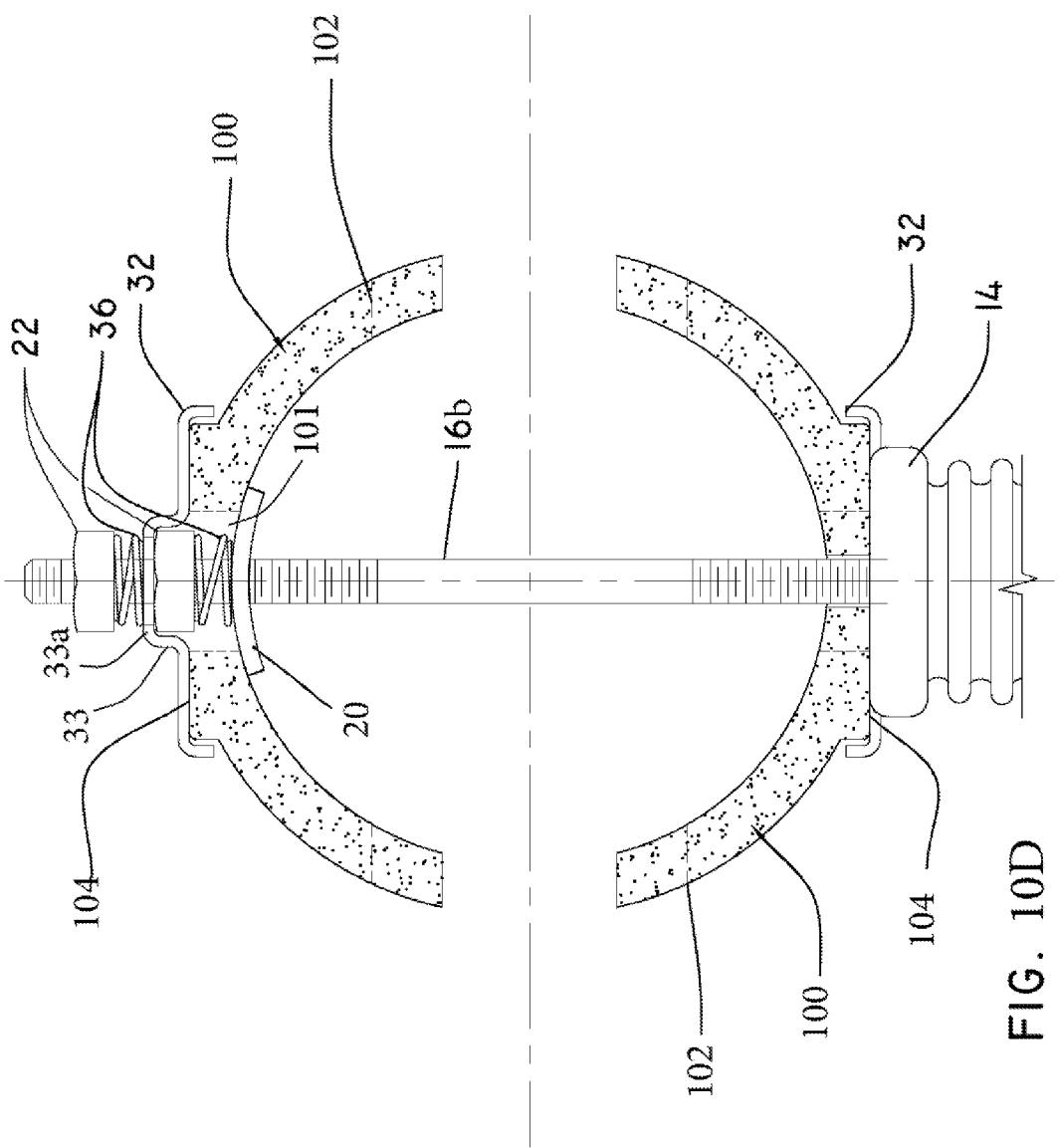
FIG. 10D is an end view of the third embodiment of the pole prosthesis having a third embodiment of a washer and through bolt connection.
Figures 10E, 10F:
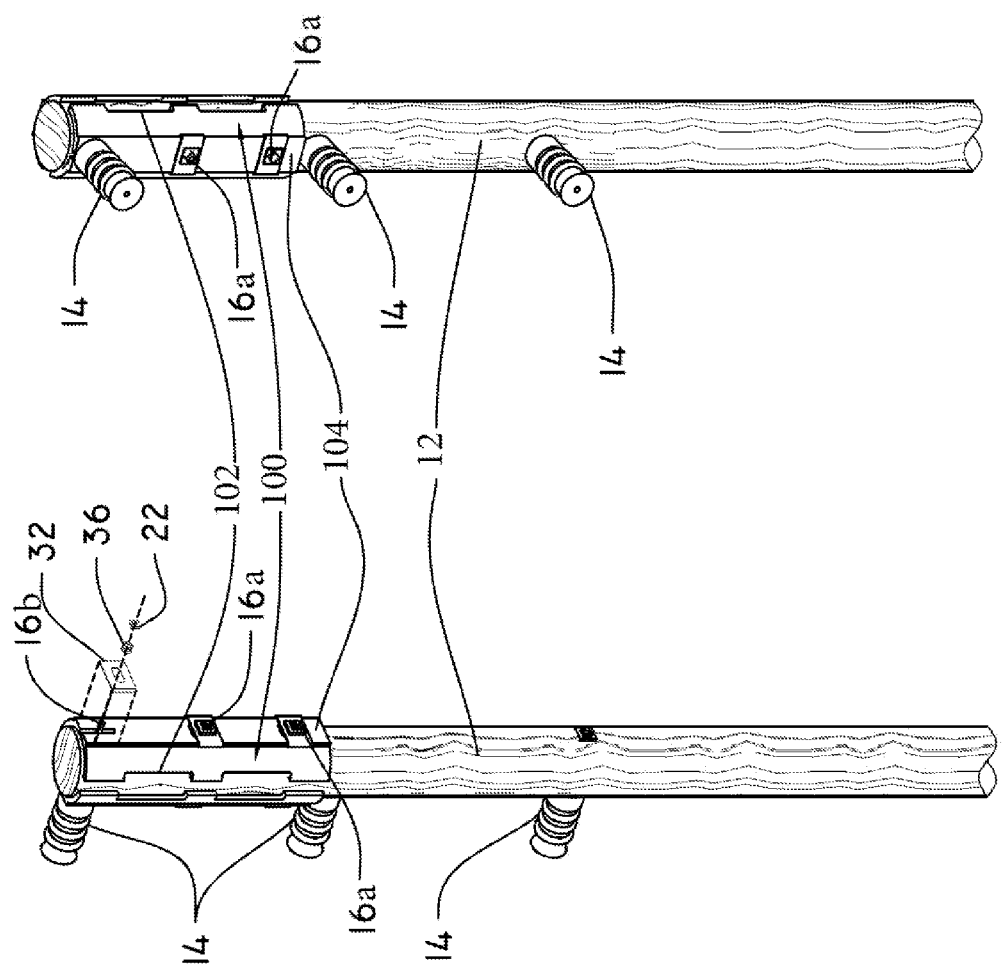
FIG. 10E is a perspective view of the third embodiment when installed on a pole.
FIG. 10F is a perspective view of the third embodiment when installed on a pole.
Figures 10G, 10H:
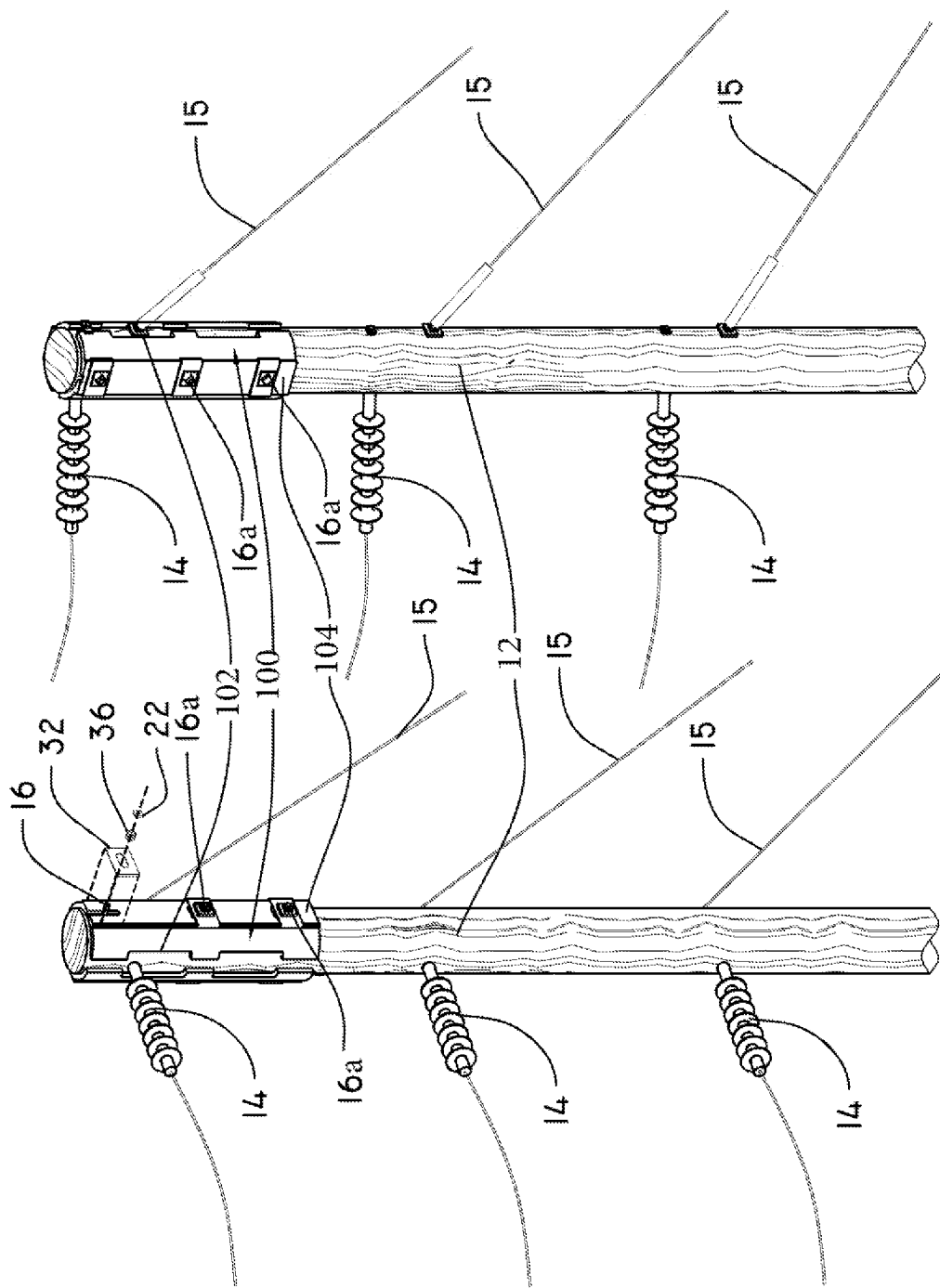
FIG. 10G is a perspective view of the third embodiment when installed on a dead end pole.
FIG. 10H is a perspective view of the third embodiment when installed on a dead end pole.

Referring now to FIGS. 10A-10H, an embodiment of the pole prosthetic includes a main body divided, preferably equally, into two halves 100. Each half 100 has a curved shape to conform to the shape of pole 12. Having two-halves is particularly useful when the upper end of a utility pole has split or become so enlarged that a single-body cylindrical sleeve can no longer receive the upper end of the utility pole. In addition, two separate halves can be secured to poles of various size while a single-body sleeve can only be applied to a pole having an outer diameter equal to or less than the inner diameter of the sleeve. Furthermore, a prosthetic having two separable halves provides greater flexibility for installation because the two halves can be applied without having to remove existing insulators and down guys as depicted in FIGS. 10G-10H.

In an embodiment, the two halves are identical structures to reduce the manufacturing costs. With identical halves, an installer may invert one half when necessary. For example, the half 100 diametrically opposed to insulator 14 may be inverted, such that insulator bolt 16b is received by bolt access 101 rather than bolt channel 103. Because insulator bolt 16b is received by bolt access 101 rather than channel 103, insulator 14 is unable to rotate insulator bolt 16b out of bolt channel 103.

Each half 100 of the main body has an effective length between 24 and 120 inches. Because utility poles often include insulators spaced between 24 and 120 inches, the disclosed range guarantees that the present invention will reinforce the connection of at least two of the uppermost insulators on a utility pole. Each half 100 includes at least one vertically disposed stringer 104 tangentially integrated on the outer or outboard surface, i.e., the surface that does not contact pole 12. Stringers 104 provide increased structural support while also providing a flat surface to more easily attach equipment that is typically found on utility poles, such as lightening arrestors, insulators, washers and fuses. As shown in FIG. 10B, washer plates 32, and insulators 14 are able to more easily mate with flat stringers 104 than would be possible on a curved surface.

Stringers 104 also include bolt channels 103 to allow halves 100 to slide around a preexisting through bolt securing an insulator to the utility pole. This feature greatly improves the ease of installation because the preexisting insulator and electrical wire can remain in place while the prosthetic is secured to the pole. An example of this ability is depicted in FIGS. 10E-10F.

Stringers 104 further include bolt apertures 101. Bolt apertures 101 provide an aperture through which support bolts 16a can be employed to secure two halves 100 to pole 12. Once the prosthetic is properly in place with the bolt apertures 101 diametrically opposed from each other, washer plates 32 receive support bolts 16a as depicted in FIGS. 10B-E. Nut 22 screw-threadedly engages support bolt 16a and secures washer plate 32, and hence, two halves 100 to pole 12. In an embodiment, bolt aperture 101 is of a width large enough to receive tools capable of securing and removing nuts 22.

Referring now to FIGS. 10B-10D, stringer 104 and washer plate 32 can have several embodiments. FIG. 10B depicts an embodiment having a generally rectangular washer plate with curved end flanges. The design conforms to the rectangular outer or outboard surface of stringer 104, i.e., the surface that does not contact pole 12. Nut 22 screw-threadedly engages bolt 16b and secures washer plate 32 and hence half of main body 100 to the top of the pole in diametric opposition to insulator 14 and the other half of main body 100. Each washer plate 32 thus performs the function of a washer.

FIG. 10C depicts a second embodiment where conventional nut 22 is removed from bolt 16b and then re-engaged thereto. In this second embodiment, each washer plate 32 has a recessed channel 32a formed in the center thereof as depicted. Channel 32a includes centrally-apertured bottom wall 32b and said bottom wall is substantially flush with washer-accommodating opening 101. Bottom wall 32b thus performs the function of a washer. With this second embodiment, the half of the main body 100 that receives washer 32 would be inverted to place opening 101 at the top end.

Each spring lock 36 fits within channel 32a, or aperture 101 depending on the location, and abuts channel bottom wall 32b. Conventional nut 22 is returned to its screw-threaded engagement with bolt 16b to bear against spring lock 36. This second embodiment has the advantage of not requiring second nut 22 as depicted in the third embodiment in FIG. 10D.

FIG. 10D depicts the third embodiment where conventional nut 22 remains in screw-threaded engagement with bolt 16b, and where additional nut 22 is also used. In this third embodiment, washer plate 32 has a raised ridge 33 that includes centrally-apertured top wall 33a. Conventional nut 22 and spring lock 36 are disposed in bearing relation to conventional washer 20. Washer plate 32 is then placed into overlying relation to stringer 104 in registration with channel 103, or aperture 101 depending on the location. A second spring lock 36 is placed into overlying relation to each top wall 33a and is secured thereto by second nut 22.

In an embodiment, stringers 104 may have a height, extending in the outboard direction when in end view, that is greater than or equal to the height of nut 22—a nut that is typically used to secure insulators to utility poles. As a result, the existing nut will not impair washer plate 32 from directly mating to stringer 104. In another embodiment, washer plate 32 may contain the design shown in FIG. 10D, which includes adequate spacing for an existing nut that protrudes beyond the height of stringer 104. Plate 32 having the design shown in FIG. 10D could also be flipped around and top wall 33a will slide into bolt channel 103, or aperture 101 depending on the location. This functionality is particularly useful when bolt 16b does not protrude substantially beyond stringer 104 and washer plate 32 must butt up against pole 12 in order to secure nut 22 to bolt 16b.

Referring now to FIGS. 10E-10F, once the prosthetic is properly in place with the through bolts 16a received by bolt channels 103, washer plate 32 receives the insulator through bolt 16b and is secured in overlying position with respect to stringer 104. Nut 22 screw-threadedly engages insulator through bolt 16b and secures washer plate 32, and hence, insulator 14 to main body 100. Each washer plate 32 thus performs the function of a washer for insulator bolt 16b. Securing insulator 14 to main body 100 has the additional benefit of reinforcing a potentially compromised attachment of insulator 14 to a rotted pole top.

In addition, spring lock 36 is preferably disposed between washer plate 32 and nut 22. Conventional nut 22 is screw-threadedly engaged with insulator through bolt 16b to bear against spring lock 36 and secure insulator 14 to main body 100.

Referring now to FIGS. 10G-10H, some equipment, such as dead-end insulators 14 or down guys (an anchor wire) 15, must be secured directly to the wooden pole. Therefore, each half includes open pole accesses 102, in the form of cutouts, for attaching halves 100 to wooden pole 12 without having to remove preexisting equipment. Open pole accesses 102 also provide easy access to the pole for attaching additional equipment directly to the pole while avoiding any interaction with the electrical wires strung from insulators 14.

As shown in FIGS. 10E-10H, support through bolts 16a are longitudinally spaced with respect to each other along the vertical extent of main body 100 to provide greater stability along the length of pole 12. An embodiment may include support bands as an alternative or in addition to support bolts 16a. The support bands wrap around halves 100 and tighten to secure halves 100 to pole 12.

Referring now to FIGS. 11A-11H, another embodiment of the pole prosthesis has a two-piece construction. As previously stated, the two-piece construction is particularly useful when fitting the pole prosthesis onto a pole top that has expanded from deterioration or when reinforcing a dead end pole.

The particular embodiment depicted in FIGS. 11A-11H includes a main body comprised of two halves 110, with each half 110 having a pair of flanges 111. When considering a single half 110, each flange 111 in the pair of flanges extends outward in a lateral direction from a longitudinal axis of main body 110, on opposite sides of main body 110, and in the same plane as one another.

Each flange includes at least two support bolt apertures 113. As a result, the two halves 110 are secured to each other through two columns of support bolts 112 rather than a single column as depicted in the previous embodiments. Additionally, installation of the present embodiment does not require a support bolt 112 to pass through the pole. Therefore, installers will never need to drill a hole into the pole 12, which improves the safety and ease of installation.

The present embodiment includes many of the features, and the respective benefits, disclosed in the embodiment shown in FIG. 10. For example, each half 110 of the main body has an effective length between 24 and 120 inches, each half 110 includes at least one vertically disposed stringer 115 tangentially integrated on the outboard surface, and each stringer includes bolt access apertures 116. Stringers 115 provide increased structural support while also providing a flat surface to more easily attaching equipment that is typically found on utility poles, such as lightening arrestors, insulators, washers and fuses.

Stringers 115 also include bolt channels 117 to allow halves 110 to slide around a preexisting through bolt securing an insulator to the utility pole. This feature greatly improves the ease of installation because the preexisting insulator and electrical wire can remain in place while the prosthetic is secured to the pole. In addition, one of the main bodies 110 may include a bolt access 116 in open communication with open bolt channel 117. Bolt access 116 is preferably large enough to accommodate the necessary tools for removing an existing attachment means from the insulator through bolt 16b if necessary. An example of these features in use is depicted in FIGS. 11E-11F.

Figure 11B:
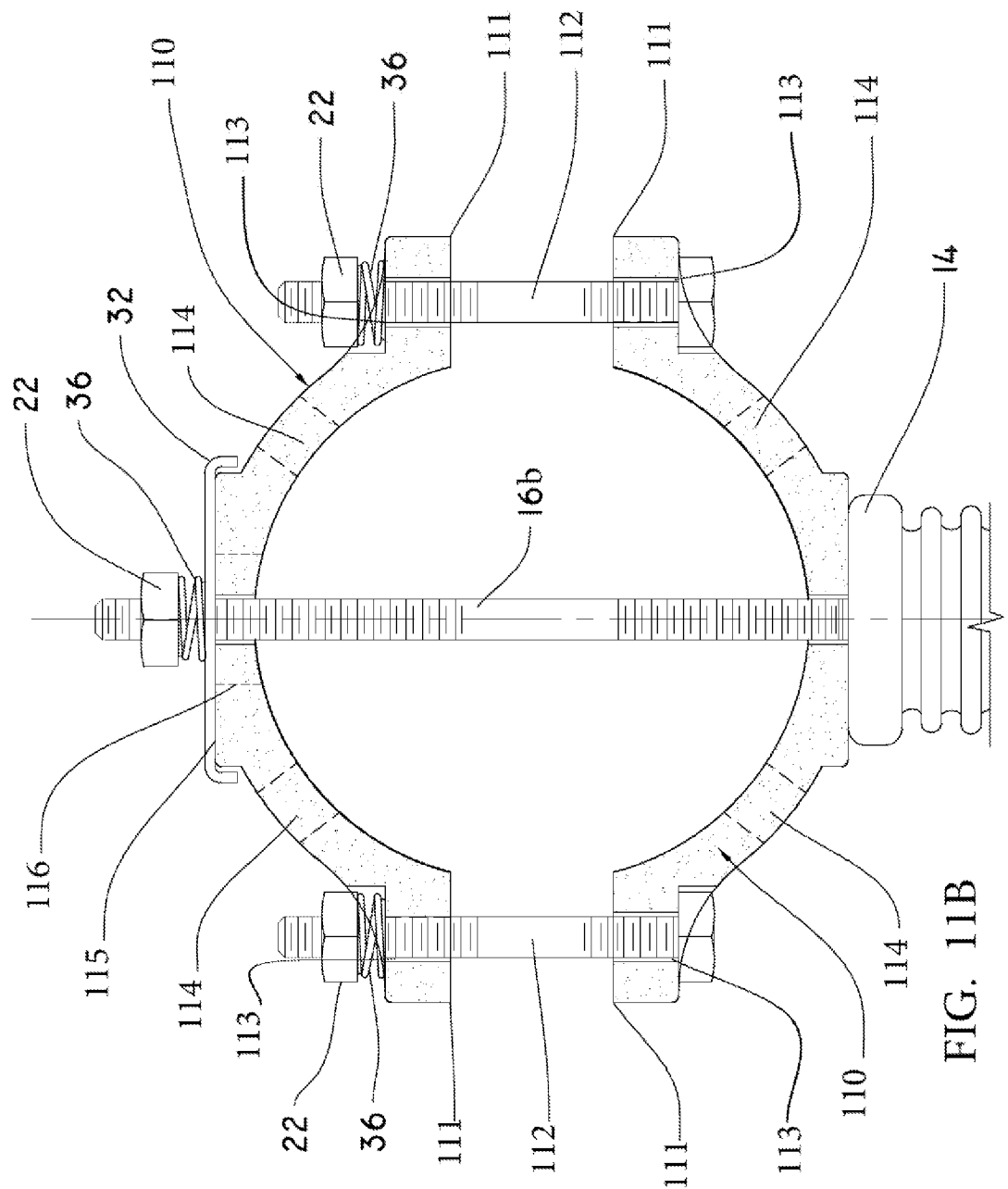
FIG. 11B is an end view of the fourth embodiment of the pole prosthesis having a first embodiment of a washer and through bolt connection.
Figure 11C:
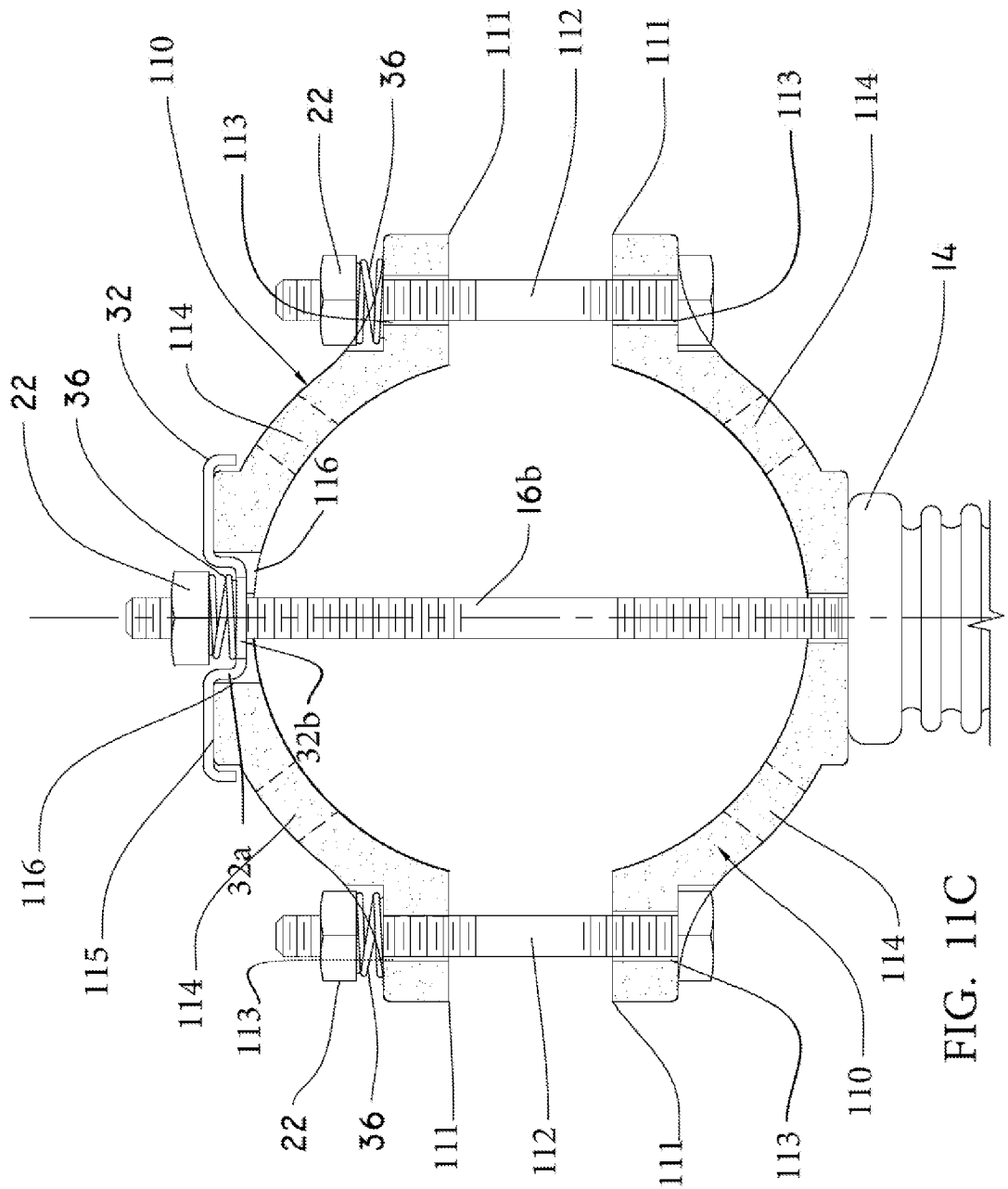
FIG. 11C is an end view of the fourth embodiment of the pole prosthesis having a second embodiment of a washer and through bolt connection.
Figure 11D:
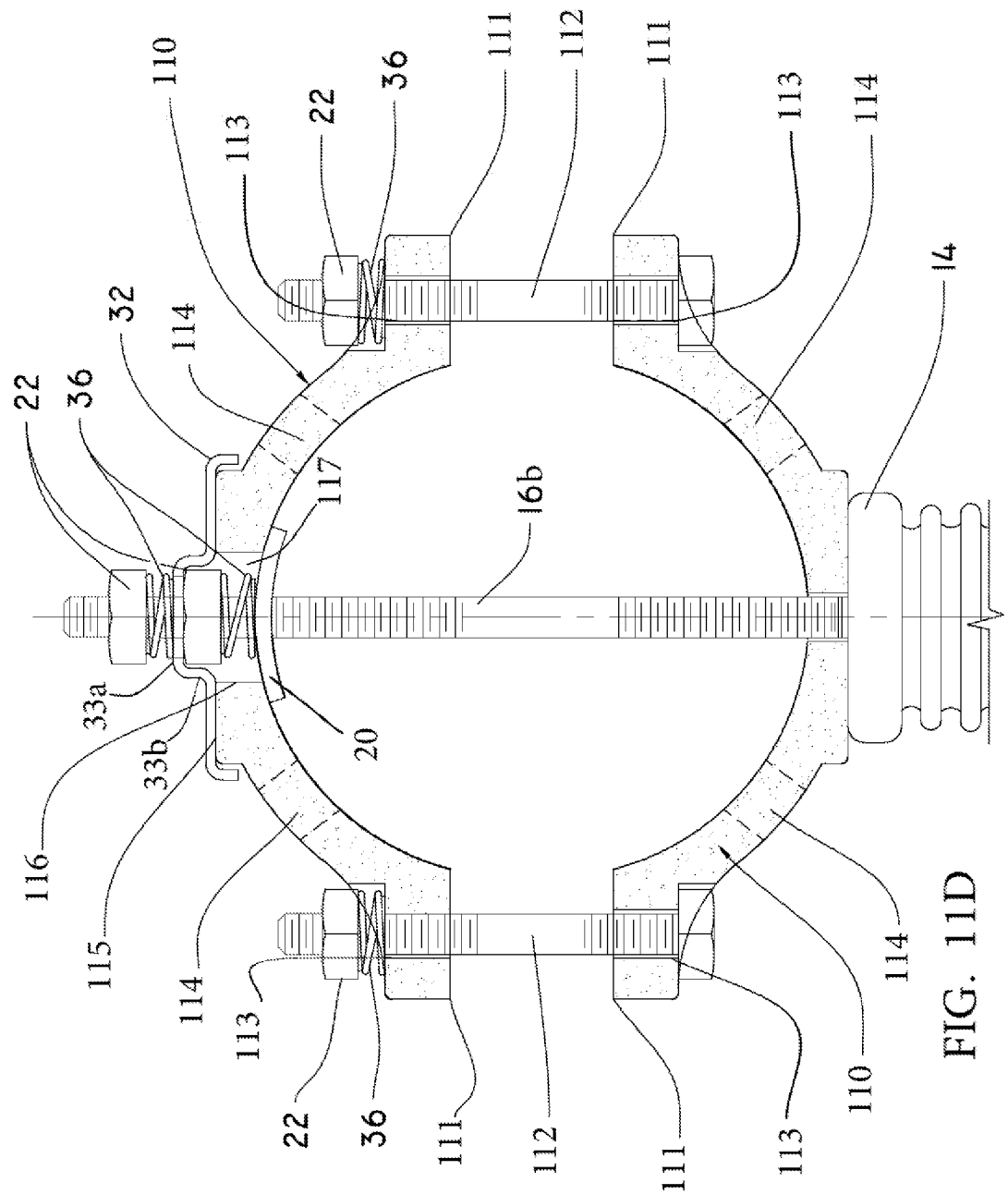
FIG. 11D is an end view of the fourth embodiment of the pole prosthesis having a third embodiment of a washer and through bolt connection.
Figures 11E, 11F:
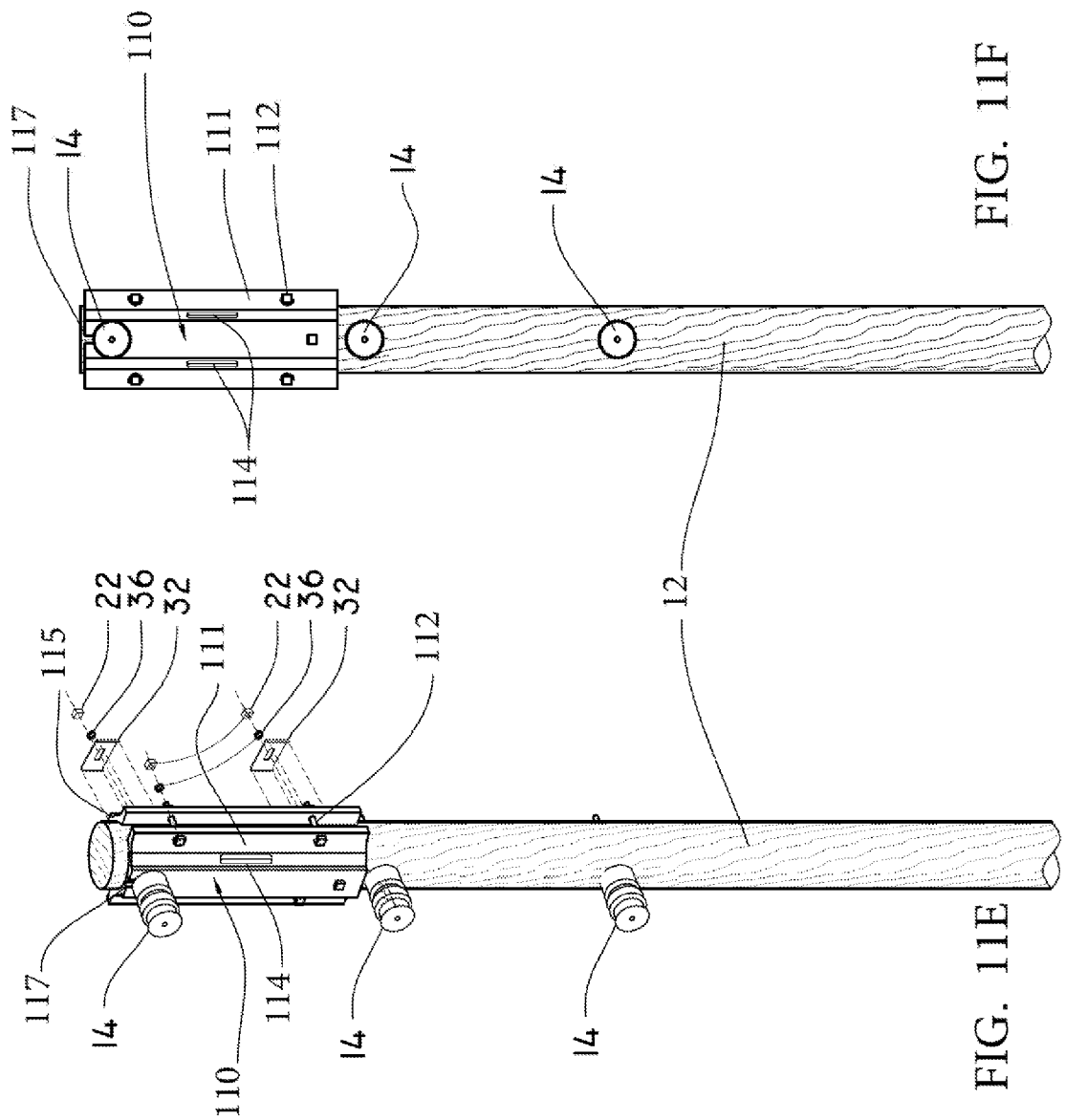
FIG. 11E is a perspective view of the fourth embodiment when installed on a pole.
FIG. 11F is an elevation view of the fourth embodiment when installed on a pole.

Bolt apertures 116 provide an aperture to access insulator through bolts 16b as depicted in FIGS. 11E-11F, or alternatively, provide access to pole 12 for securing equipment directly to pole 12, as depicted in FIGS. 11G-11H. Halves 110 further include pole accesses 114 located between stringers 115 and flanges 111.

Referring to FIGS. 11B-11D, support bolts 112 secure halves 111 in diametrically opposed relation to each other with bolt apertures 113 disposed in flanges 111. Washer plates 32 receive insulator through bolts 16b and nut 22 screw-threadedly engages bolt 16b and secures washer plate 32.

Referring now to FIGS. 11B-11D, stringer 115 and washer plate 32 can have several embodiments. FIG. 11B depicts an embodiment having a generally rectangular washer plate with curved end flanges. The design conforms to the rectangular outer or outboard surface of stringer 115, i.e., the surface that does not contact pole 12. Nut 22 screw-threadedly engages bolt 16b and secures washer plate 32 and hence half of main body 110 to the top of pole 12 in diametric opposition to insulator 14 and the other half of main body 110. Each washer plate 32 thus performs the function of a washer.

FIG. 11C depicts a second embodiment where conventional nut 22 is removed from bolt 16b and then re-engaged thereto. In this second embodiment, each washer plate 32 has a recessed channel 32a formed in the center thereof as depicted. Channel 32a includes centrally-apertured bottom wall 32b and said bottom wall is substantially flush with washer-accommodating opening 116. Bottom wall 32b thus performs the function of a washer.

Each spring lock 36 fits within channel 32a, or aperture 116 depending on the location, and abuts channel bottom wall 32b. Conventional nut 22 is returned to its screw-threaded engagement with bolt 16b to bear against spring lock 36. This second embodiment has the advantage of not requiring second nut 22 as depicted in the third embodiment in FIG. 11D.

FIG. 11D depicts a third embodiment where conventional nut 22 remains in screw-threaded engagement with bolt 16b, and where additional nut 22 is also used. In this third embodiment, washer plate 32 has a raised ridge 33 that includes centrally-apertured top wall 33a. Conventional nut 22 and spring lock 36 are disposed in bearing relation to conventional washer 20. Washer plate 32 is then placed into overlying relation to stringer 115 in registration with channel 117, or aperture 116 depending on the location. A second spring lock 36 is placed into overlying relation to each top wall 33a and is secured thereto by second nut 22.

In an embodiment, stringers 115 may have a height, extending in the outboard direction when in end view, that is greater than or equal to the height of nut 22—a nut that is typically used to secure insulators to utility poles. As a result, the existing nut will not impair washer plate 32 from directly mating to stringer 115.

An embodiment of washer plate 32 may include a transversely oblong central aperture to account for rotation of the pole top, which is often found in rotted poles. The oblong aperture enables both an upper and a lower existing insulator through bolt 16b to pass through washer plates 32 even when the upper insulator through bolt has rotated with respect to the lower insulator through bolt.

Referring now to FIGS. 11G-11H, some equipment, such as dead-end insulators 14 or down guys (an anchor wire) 15, must be secured to the wooden pole. Therefore, each half 110 preferably includes a curved section that has an inner circumference that is less than half of the circumference of pole 12. Consequently, there will be a gap between the flanges 111 on each half 110 as depicted in FIGS. 11G-11H. Dead-end insulators 14 or down guys (an anchor wire) 15 can be secured to the wooden pole 12 in the gaps as shown.

The present invention's ability to receive and reinforce an installed insulator without first removing at least one insulator from a utility pole provides a critical benefit over existing devices. These insulators often support extremely high voltage wires, which makes removal of an insulator extremely dangerous. These insulators should remain undisturbed if possible and doing so greatly improves the safety of the individual attempting to reinforce a rotted utility pole.

It will thus be seen that the objects set forth above, and those made apparent from the foregoing disclosure, are efficiently attained and since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A prosthetic apparatus for reinforcing a top of an upstanding pole, comprising:
   a first half of a main body and a second half on the main body, wherein the first half is secured to the second half with an upper portion of the upstanding pole sandwiched therebetween;
   the first half includes a first end, a second end, and an extent between the first and second ends, the first half further including:
      the extent having a curved cross-sectional shape extending between a first side and a second side of the curved cross-sectional shape, and the cross-sectional shape having an inner diameter configured conform to a curvature of the upstanding pole;
      bolt receiving channel in the first end of the first half of the main body, thereby allowing the first half to slide around an existing insulator through bolt without requiring an installer to remove the existing insulator before installation of the first half;
      a pair of planar flanges, wherein a first flange is integrated into the curved extent at the first side of the curved cross-sectional shape and extends outward therefrom in a lateral direction, and a second flange is integrated into the elongate base support at the second side of the semi-circular cross-sectional shape and extends outward therefrom in a lateral direction, and the flanges extending in the same plane as each other;
      each flange further including at least one bolt receiving aperture;
   the second half includes a first end, a second end, and an extent between the first and second ends, the second half further including:
      the extent having a curved cross-sectional shape extending between a first side and a second side of the curved cross-sectional shape, and the cross-sectional shape having an inner diameter configured conform to the curvature of the upstanding pole;
      a bolt receiving channel in the first end of the second half of the main body, thereby allowing the second half to slide around an existing insulator through bolt without requiring an installer to remove the existing insulator before installation of the second half;
      a pair of planar flanges, wherein a first flange is integrated into the curved extent at the first side of the curved cross-sectional shape and extends outward therefrom in a lateral direction, and a second flange is integrated into the elongate base support at the second side of the semi-circular cross-sectional shape and extends outward therefrom in a lateral direction, and the flanges extending in the same plane as each other;
      each flange further including at least one bolt receiving aperture; and
   securing bolts extending between the bolt receiving apertures in the flanges on the first half to the bolt receiving apertures in the flanges on the second half, thereby securing the first half to the second half with a portion of an upper end of the upstanding pole sandwiched therebetween.

2. The prosthetic apparatus of claim 1, further comprising a bolt access aperture disposed in the first half of the main body, wherein the bolt receiving channel extends between the first end of the first half of the main body and the bolt access aperture.

3. The prosthetic apparatus of claim 1, further comprising an open pole accesses disposed in the first half of the main body, thereby providing an attachment point for securing equipment directly to the upstanding pole.

4. The prosthetic apparatus of claim 1, further comprising a flat elongate ridge extending outwardly from a mid-point of the curved cross-sectional extent of the first half of the main body and a flat elongate ridge extending outwardly from a mid-point of the curved cross-sectional extent of the second half of the main body.

5. The prosthetic apparatus of claim 4, wherein the flat elongate ridge has a height, extending radially with respect to the main body when in end view, that is greater than a height, extending radially with respect to the main body when in end view, of an existing nut secured to the insulator through bolt.

6. The prosthetic apparatus of claim 4, wherein the flat elongate ridge has a width, extending tangentially with the outer surface of the main body when in end view, that is greater than a width, tangentially with the outer surface of the main body when in end view, of a bolt access aperture in open communication with the bolt receiving channel.

7. The prosthetic apparatus of claim 1, wherein the bolt receiving channel has a width, extending tangentially with the outer surface of the main body when in end view, that is greater than a width, tangentially with the outer surface of the main body when in end view, of an existing nut secured to the insulator through bolt.

8. A prosthetic apparatus for reinforcing a top of an upstanding pole, comprising:
- a first half of a main body and a second half on the main body, wherein the first half is secured to the second half with a portion of an upper end of the upstanding pole sandwiched therebetween;
- the first half includes a first end, a second end, and an extent between the first and second ends, the first half further including:
  - the extent having a curved cross-sectional shape extending between a first side and a second side of the curved cross-sectional shape, and the cross-sectional shape having an inner diameter configured conform to a curvature of the upstanding pole;
  - at least one cutout in the first side of the curved cross-sectional shape, wherein the cutout extends towards a midpoint of the first half of the main body;
  - at least one cutout in the second side of the curved cross-sectional shape, wherein the cutout extends towards a midpoint of the first half of the main body;
  - a bolt receiving channel in the first end of the first half of the main body, thereby allowing the first half to slide around an existing insulator through bolt without requiring an installer to remove the existing insulator before installation of the first half;
  - a bolt receiving aperture disposed proximate to the second end of the first half;
- the second half includes a first end, a second end, and an extent between the first and second ends, the second half further including:
  - the extent having a curved cross-sectional shape extending between a first side and a second side of the curved cross-sectional shape, and the cross-sectional shape having an inner diameter configured conform to the curvature of the upstanding pole;
  - at least one cutout in the first side of the curved cross-sectional shape, wherein the cutout extends towards a midpoint of the second half of the main body and coincides with the location of the cutout in the second side of the curved cross-sectional shape of the first half of the main body;
  - at least one cutout in the second side of the curved cross-sectional shape, wherein the cutout extends towards a midpoint of the second half of the main body and coincides with the location of the cutout in the first side of the curved cross-sectional shape of the first half of the main body;
  - a bolt receiving channel in the first end of the second half of the main body, thereby allowing the second half to slide around an existing insulator through bolt without requiring an installer to remove the existing insulator before installation of the second half;
  - a bolt receiving aperture disposed proximate to the second end of the first half; and
- securing bolts extending between the bolt receiving aperture on the first half to the bolt receiving aperture on the second half, thereby securing the first half to the second half with a portion of an upper end of the upstanding pole sandwiched therebetween.

9. The prosthetic apparatus of claim 8, further comprising a flat elongate ridge extending outwardly from the mid-point of the curved cross-sectional extent of the first half of the main body and a flat elongate ridge extending outwardly from the mid-point of the curved cross-sectional extent of the second half of the main body.

10. The prosthetic apparatus of claim 9, wherein the flat elongate ridge has a height, extending radially with respect to the main body when in end view, that is greater than a height, extending radially with respect to the main body when in end view, of an existing nut secured to the insulator through bolt.

11. The prosthetic apparatus of claim 9, wherein the flat elongate ridge has a width, extending tangentially with the outer surface of the main body when in end view, that is greater than a width, tangentially with the outer surface of the main body when in end view, of a bolt access aperture in open communication with the bolt receiving channel.

12. The prosthetic apparatus of claim 8, wherein the bolt receiving channel has a width, extending tangentially with the outer surface of the main body when in end view, that is greater than a width, tangentially with the outer surface of the main body when in end view, of an existing nut secured to the insulator through bolt.

\* \* \* \* \*